United States Patent
Nakayama et al.

(10) Patent No.: US 7,672,027 B2
(45) Date of Patent: Mar. 2, 2010

(54) IMAGE READING APPARATUS

(75) Inventors: Yosuke Nakayama, Shiojiri (JP); Kensuke Tamai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 105 days.

(21) Appl. No.: 12/215,527

(22) Filed: Jun. 27, 2008

(65) Prior Publication Data

US 2009/0009824 A1    Jan. 8, 2009

(30) Foreign Application Priority Data

Jul. 2, 2007    (JP)    ............... 2007-174231

(51) Int. Cl.
  H04N 1/04    (2006.01)
  H04N 1/40    (2006.01)
  H04N 1/32    (2006.01)
  H04N 1/36    (2006.01)
(52) U.S. Cl. .................. 358/498; 358/486; 358/474; 358/406; 358/412; 358/468; 358/443; 382/190
(58) Field of Classification Search ........... 358/497, 358/486, 488, 474, 406, 412, 468, 443; 382/190
See application file for complete search history.

(56) References Cited

U.S. PATENT DOCUMENTS

| 2008/0225357 A1 * | 9/2008 | Ohara et al. ............ 358/498 |
| 2009/0009827 A1 * | 1/2009 | Tamai et al. ........... 358/497 |
| 2009/0010543 A1 * | 1/2009 | Tamai et al. ........... 382/190 |

FOREIGN PATENT DOCUMENTS

| JP | 61160767 A   * | 7/1986 |
| JP | 2000-113162    | 4/2000 |
| JP | 2007079076 A * | 3/2007 |

* cited by examiner

*Primary Examiner*—Cheukfan Lee
(74) *Attorney, Agent, or Firm*—Nutter McClennen & Fish LLP; John J. Penny, Jr.

(57) ABSTRACT

An image reading apparatus includes a reading unit, a control unit and a reference color region. The control unit includes a preliminary read processing unit, a first image acquisition unit, a second image acquisition unit and a reprocessing instruction unit. The reprocessing instruction unit specifies a schematic position of a reference region in the sub-scanning direction and instructs the preliminary read processing unit to perform preliminary reading again at the schematic position of the reference region.

4 Claims, 14 Drawing Sheets

| SET NUMBER OF TIMES | 0 | 1 | 2 | 3 | 4 | 5 | 6 | 7 | 8 | 9 | 10 |
|---|---|---|---|---|---|---|---|---|---|---|---|
| ADJUSTMENT VALUE Va | 0 | +1 | −1 | +2 | −2 | +3 | −3 | +4 | −4 | +5 | −5 |

VT

IMAGE READING APPARATUS

The entire disclosure of Japanese Patent Application No. 2007-174231, filed Jul. 2, 2007 is expressly incorporated by reference herein.

BACKGROUND

1. Technical Field

The present invention relates to an image reading apparatus and, more particularly, to a technology for detecting a predetermined pattern that defines a reference position that specifies a reading position in the image reading apparatus.

2. Related Art

Scanners are widely used as image reading apparatuses that optically read a reading object with an image sensor and then generate image data on the basis of the read result. In the existing art, each of the scanners uses a position sensor in order to determine a reading position in the scanner. In addition, another method has been known in which a reading position is determined in such a manner that, for example, a predetermined pattern formed of a black region and a white region is provided for the scanner, an image of the pattern is detected from read image data and then the position of the detected image of the pattern is set as a reference position (which is, for example, described in JP-A-2000-113162).

In the technology described in JP-A-2000-113162, a carriage is configured to be located around a home position when power is turned on, and the position of a predetermined pattern is also specified in connection with the home position. However, in the scanner, it is conceivable that, for example, as in the case immediately after abnormal end, the carriage may be located at a position different from the home position when power is turned on. In such a case, because the position of a predetermined pattern is not specified, the process to search and detect a predetermined pattern should be performed. The detection of a predetermined pattern is preferably performed quickly and reliably.

SUMMARY

An advantage of some aspects of the invention is that it provides a technology for making it possible to quickly and reliably detect a predetermined pattern in an image reading apparatus.

The invention may be implemented as the following aspects or application examples.

First Application Example

An image reading apparatus includes a reading unit, a control unit, a pattern region, and a reference color region. The reading unit moves a linear reading range, which is provided in a main scanning direction, in a sub-scanning direction that intersects with the main scanning direction while reading an object that faces the reading range, and generates image data on the basis of a read result. The control unit controls the reading unit. The pattern region includes a predetermined pattern that defines a reference position for specifying a reading position that is read by the reading unit. The predetermined pattern has a characteristic portion that specifies a schematic position of the predetermined pattern in the sub-scanning direction. A positional relationship in the sub-scanning direction between the reference color region and the pattern region is set in advance. The reference color region is colored in a predetermined reference color. The control unit includes a preliminary read processing unit, a parameter setting unit, a first image acquisition unit, a pattern searching unit, a general-purpose value storage unit, a second image acquisition unit, a characteristic portion searching unit, and a reprocessing instruction unit. The preliminary read processing unit instructs the reading unit to perform preliminary reading. The parameter setting unit sets a value of a predetermined reading parameter, which is used when reading is performed by the reading unit, on the basis of a relationship between image data, which are generated through the preliminary reading, and the reference color. The first image acquisition unit instructs the reading unit to read a position, at which the pattern region should be positioned when the reading position read through the preliminary reading is assumed to be in the reference color region, using the set value of the reading parameter and then acquires first image data. The pattern searching unit searches an image of the predetermined pattern in the first image data. The general-purpose value storage unit stores a value that is set as a general-purpose value of the predetermined reading parameter in advance so that at least the characteristic portion can be detected from image data that are generated through reading of the pattern region using the general-purpose value. The second image acquisition unit, when an image of the predetermined pattern has not been detected by the pattern searching unit, instructs the reading unit to perform reading using the general-purpose value, and then acquires second image data. The characteristic portion searching unit searches an image of the characteristic portion in the second image data. The reprocessing instruction unit specifies a schematic position of the reference region in the sub-scanning direction on the basis of a position of the image of the characteristic portion detected by the characteristic portion searching unit, and instructs the preliminary read processing unit to perform preliminary reading again at the schematic position of the reference region.

In the above image reading apparatus, the second image data are generated through reading using the general-purpose value. The general-purpose value is set in advance so that at least the characteristic portion can be detected from the image data that are generated through reading of the pattern region using the general-purpose value. Thus, irrespective of the position at which the preliminary reading is performed, when the second image data correspond to an image that includes the image of the predetermined pattern, the characteristic portion will be detected. Because the schematic position of the predetermined pattern in the sub-scanning direction is specified by the characteristic portion, when the characteristic portion has been detected, the schematic position of the image of the predetermined pattern may be specified. Thus, in the above image reading apparatus, it is possible to quickly and reliably detect the predetermined pattern.

Second Application Example

In the image reading apparatus according to the first application example, the second image acquisition unit may instruct the reading unit to repeatedly perform reading while changing the reading position and to repeatedly acquire the second image data until the image of the characteristic portion has been detected by the characteristic portion searching unit.

In the above image reading apparatus, because the second image data are repeatedly acquired until the image of the characteristic portion has been detected, it is possible to reliably detect the predetermined pattern.

Third Application Example

In the image reading apparatus according to the first or second application example, the predetermined pattern may be formed of a plurality of regions that are aligned along the main scanning direction, wherein the characteristic portion may be a boundary portion of the two adjacent regions that constitute the predetermined pattern.

In the above image reading apparatus, it is possible to quickly and reliably detect the predetermined pattern that is formed of the plurality of regions that are aligned along the main scanning direction.

Fourth Application Example

In the image reading apparatus according to any one of the first to third application examples, the characteristic portion searching unit may search the image of the characteristic portion from a portion of data corresponding to the position of the characteristic portion in the second image data.

In the above image reading apparatus, it is possible to further effectively detect the image of the characteristic portion from the second image data, so that it is possible to further quickly detect the predetermined pattern.

Note that the aspects of the invention may be implemented in various forms. For example, it may be implemented in a form, such as an image processing method and device, an image reading method and device, an image input method and device, a computer program for implementing the functions of these methods or devices, a recording medium that contains the computer program, data signals that are realized in carrier waves that contain the computer program, and the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
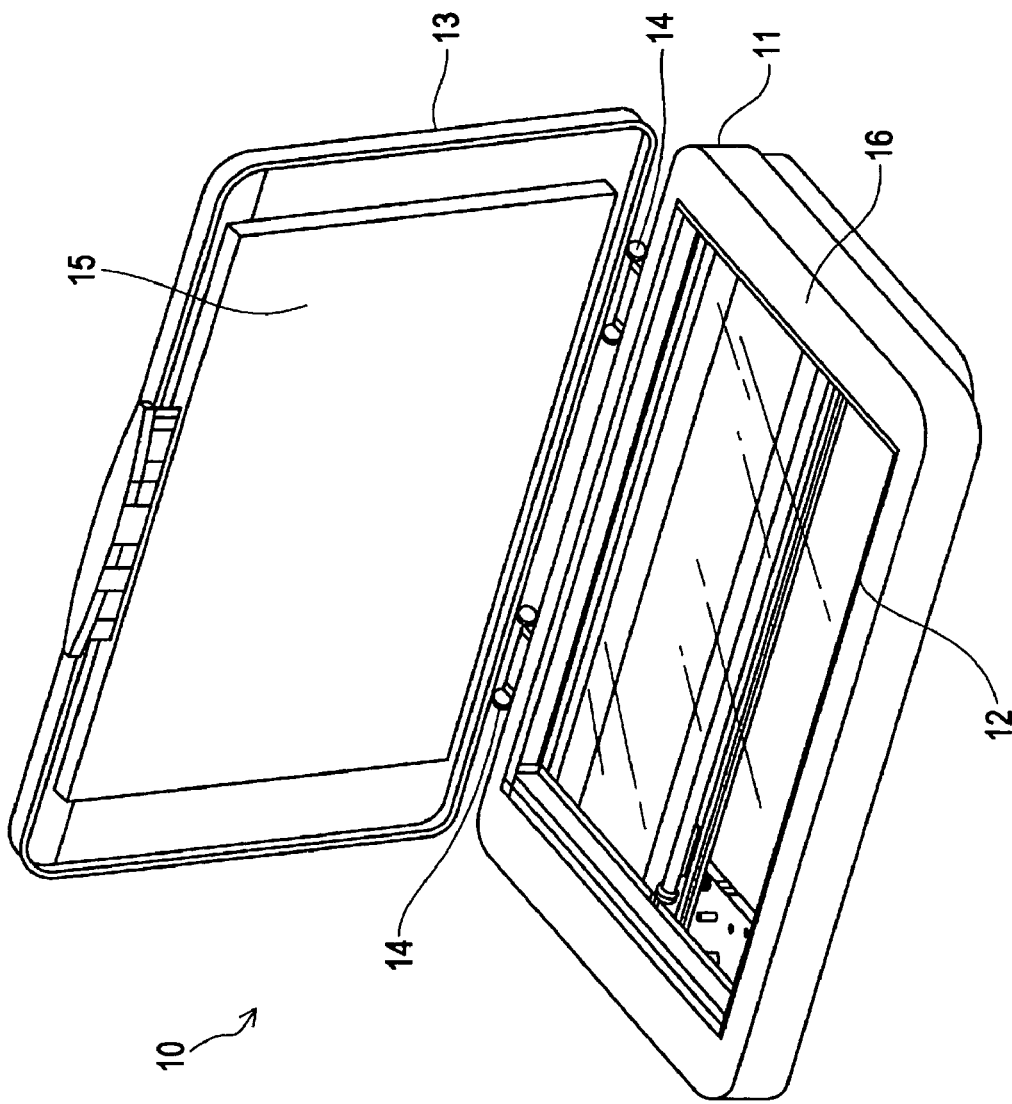
FIG. 1 is a perspective view that schematically shows the appearance of a scanner according to an embodiment of the invention.

Hereinafter, an embodiment of the invention will be described in the following order on the basis of an example embodiment.
A. Embodiment
A-1. Configuration of Apparatus
A-2. Home Position Searching Process
B. Alternative Embodiments A. Embodiment A-1. Configuration of Apparatus FIG. 1 is a perspective view that schematically shows the appearance of a scanner 10 according to an embodiment of the invention. The scanner 10 is an image reading apparatus that optically reads a reading object and generates image data on the basis of the read result. In addition, the scanner 10 also functions as an image processing device in terms of making it possible to perform image processing on generated image data.

The scanner 10 according to the present embodiment is a so-called flatbed scanner. The scanner 10 includes a case 11, an original mounting plate 12, and an original holding cover 13. The case 11, which serves as a cabinet, accommodates an internal mechanism, which will be described later. The original holding cover 13 is rotatably attached to the case 11 through a hinge 14. The case 11 includes a support portion 16 on its upper face. The support portion 16 supports the original mounting plate 12.

The original mounting plate 12 is a substantially rectangular flat plate and is attached to the support portion 16. The original mounting plate 12 is, for example, formed of a transparent glass plate or a transparent plastic plate. In addition, a holding face 15 is provided on a face of the original holding cover 13, which faces the original mounting plate 12. The holding face 15 is, for example, formed of a substantially white-colored resin sheet. In the scanner 10, an original may be adhered to the original mounting plate 12 in such a manner that the original is mounted on the original mounting plate 12 and is pressed down from the upper side by the original holding cover 13.

Figure 2:
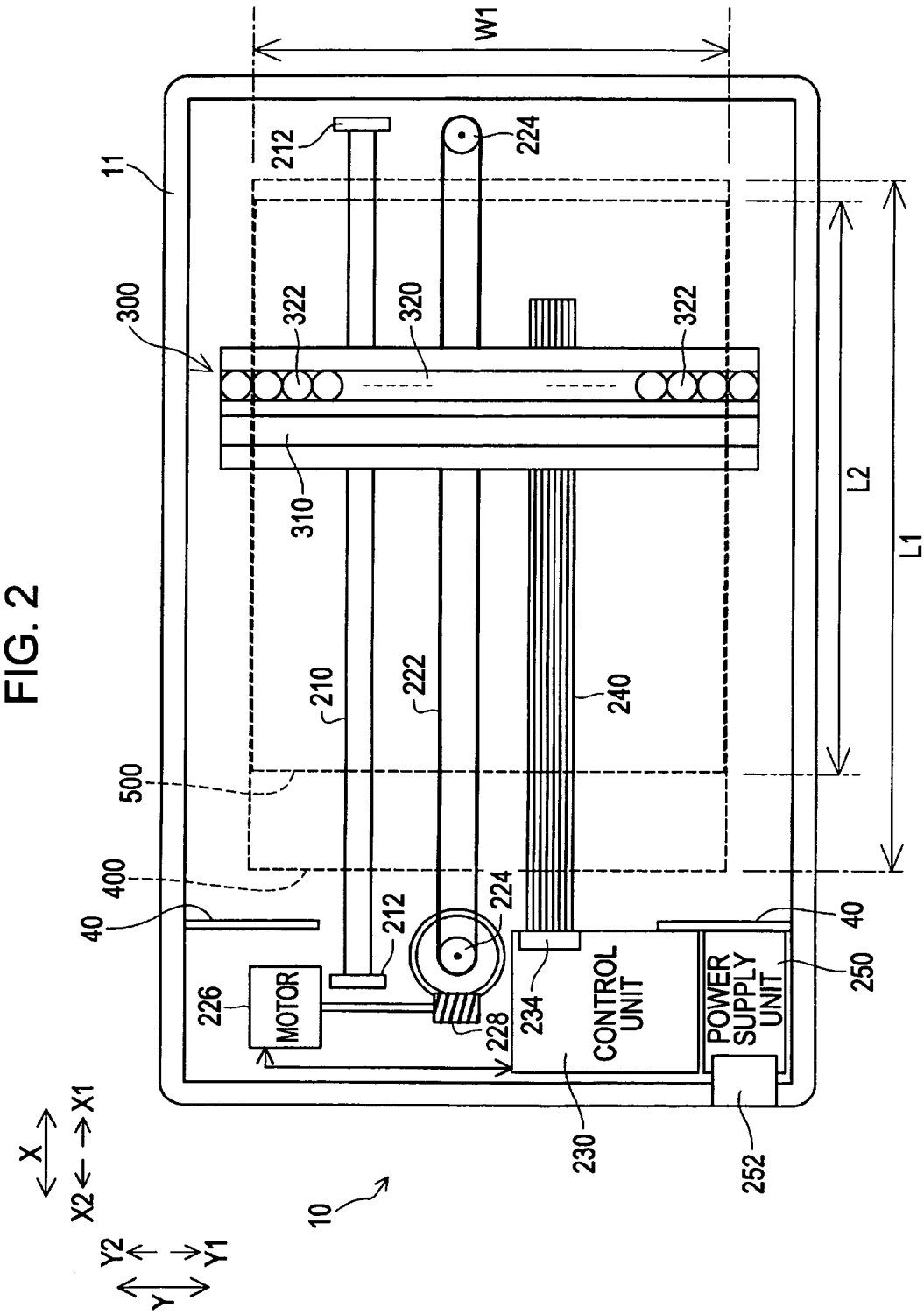
FIG. 2 is a plan view that schematically shows the internal mechanism of the scanner.

FIG. 2 is a plan view that schematically shows the internal mechanism of the scanner 10. The original holding cover 13, the original mounting plate 12, the support portion 16 of the case 11, and the like, which are shown in FIG. 1, are not shown in FIG. 2. The scanner 10 further includes, inside the case 11, a carriage 300, a guide rail 210, a timing belt 222, a stepping motor 226, a stop plate 40, a flat cable 240, a control unit 230, and a power supply unit 250.

The guide rail 210 is arranged substantially parallel to the longitudinal direction (X direction in FIG. 2) of the case 11, and is fixed to the case 11 at both ends by brackets 212. The carriage 300 is supported by the guide rail 210 so that the carriage 300 can reciprocally move along the guide rail 210.

Note that, in the specification, the direction in which the carriage 300 moves along the guide rail 210 (X direction in FIG. 2) is termed as "sub-scanning direction", one direction along the sub-scanning direction (X1 direction in FIG. 2) is termed as "sub-scanning forward direction", and the other direction along the sub-scanning direction (X2 direction in FIG. 2) is termed as "sub-scanning reverse direction". In addition, the direction perpendicular to the sub-scanning direction (Y direction in FIG. 2) is termed as "main scanning direction", one direction along the main scanning direction (Y1 direction in FIG. 2) is termed as "main scanning forward direction", and the other direction along the main scanning direction (Y2 direction in FIG. 2) is termed as "main scanning reverse direction". Note that the main scanning direction in the present embodiment may be regarded as a first direction according to the aspects of the invention, and the sub-scanning direction may be regarded as a second direction according to the aspects of the invention.

The timing belt 222 is wound between a pair of pulleys 224, and a portion of the timing belt 222 is connected to the carriage 300. One of the pair of pulleys 224 is driven for rotation by the stepping motor 226 through a gear 228. As the pulley 224 is driven for rotation, the timing belt 222 runs between the pulleys 224, and the carriage 300 connected to the timing belt 222 moves along the guide rail 210 in the sub-scanning direction.

The carriage 300 includes, on its upper face, a light emitting unit 310 and a light receiving unit 320. The light emitting unit 310 and the light receiving unit 320 both are arranged over the overall length of the carriage 300 in the main scanning direction. The light emitting unit 310, for example, includes a light emitting element, such as an LED, and irradiates light. On the other hand, the light receiving unit 320 includes a plurality of light receiving elements 322 that are aligned along the main scanning direction. The light receiving elements 322 each are formed by combining an image sensor, which is, for example, a CCD or CMOS imaging device, with a rod lens (cell fox lens) that gathers light on the image sensor. The light receiving elements 322 each receive reflected light of light that is irradiated from the light emitting unit 310 and outputs a voltage of which the magnitude corresponds to the intensity of light received. The light receiving unit 320 further includes an A/D conversion circuit that converts a voltage value (analog value), which is output from the light receiving elements 322, into a digital value. Note that the carriage 300 used in the scanner 10 according to the present embodiment is generally termed as close contact type.

The carriage 300 is able to optically read an object that faces the light receiving unit 320 over the range of a width W1 in the main scanning direction in such a manner that the plurality of light receiving elements 322 of the light receiving unit 320 detect reflected light of light that is irradiated from the light emitting unit 310. The carriage 300 performs the above reading while moving in the sub-scanning direction, so that the read image data of the object that faces the light receiving unit 320 are generated. Note that, in the light receiving unit 320, the light receiving elements 322 located at both ends and outside the range of the width W1 are spare light receiving elements 322. In addition, the carriage 300 in the scanner 10 and the mechanism (the guide rail 210, the timing belt 222, the stepping motor 226, and the like) that reciprocally moves the carriage 300 may be regarded as "reading unit" according to the aspects of the invention.

The power supply unit 250 supplies power for actuating the scanner 10. The power supply unit 250 may be provided with a configuration that stores electric power by itself or may be provided with a configuration that receives electric power supplied externally through a connector 252.

The control unit 230 is electrically connected through a connector 234 and the flat cable 240 to the carriage 300, and is also electrically connected to the stepping motor 226. The control unit 230 controls all the operations of the scanner 10. For example, the control unit 230 detects the number of steps of the stepping motor 226 and controls electric power supplied from the power supply unit 250 to the stepping motor 226 on the basis of the detected number of steps. Thus, the control unit 230 controls the movement of the carriage 300 in the sub-scanning direction. In addition, the control unit 230 has a storage device (not shown), and is able to store image data, or the like, that are generated through reading by the carriage 300. In addition, the control unit 230 may be connected through a connector (not shown) to an external component outside the scanner 10. The control unit 230 is able to transmit image data that are generated through reading by the carriage 300 to an external information processing device (not shown).

Figure 3:
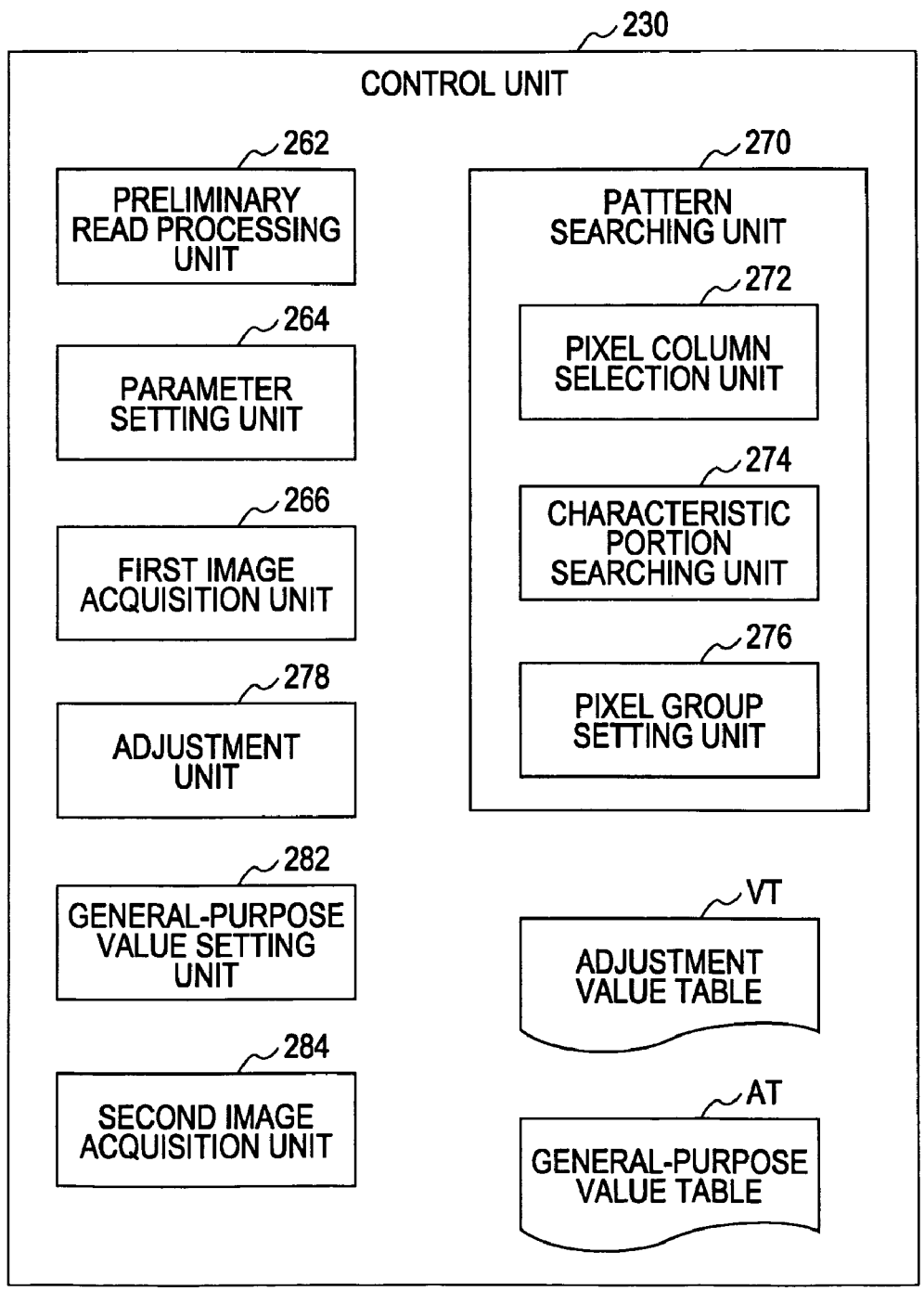
FIG. 3 is a block diagram that shows the functional configuration for executing a home position searching process in a control unit.

The control unit 230 further includes a functional configuration for executing a home position searching process, which will be described later. FIG. 3 is a block diagram that shows the functional configuration for executing the home position searching process in the control unit 230. As shown in FIG. 3, the control unit 230 includes a preliminary read processing unit 262, a parameter setting unit 264, a first image acquisition unit 266, a pattern searching unit 270, an adjustment unit 278, a general-purpose value setting unit 282, and a second image acquisition unit 284. In addition, the pattern searching unit 270 includes a pixel column selection unit 272, a characteristic portion searching unit 274, and a pixel group setting unit 276. The control unit 230 has a CPU and a storage area (not shown). The control unit 230 executes a computer program in such a manner that the CPU reads out the computer program stored in the storage area. Thus, the control unit 230 implements the functions of the above described units. The functions of these units included in the control unit 230 will be described together with the home position searching process, which will be described later, in detail.

In addition, the control unit 230 has a general-purpose value table AT that is used by the general-purpose value setting unit 282 and an adjustment value table VT that is used by the adjustment unit 278. The general-purpose value table AT and the adjustment value table VT are stored in the storage area (not shown) of the control unit 230. The content of the general-purpose value table AT and the adjustment value table VT will also be described together with the home position searching process, which will be described later, in detail.

Figure 4:
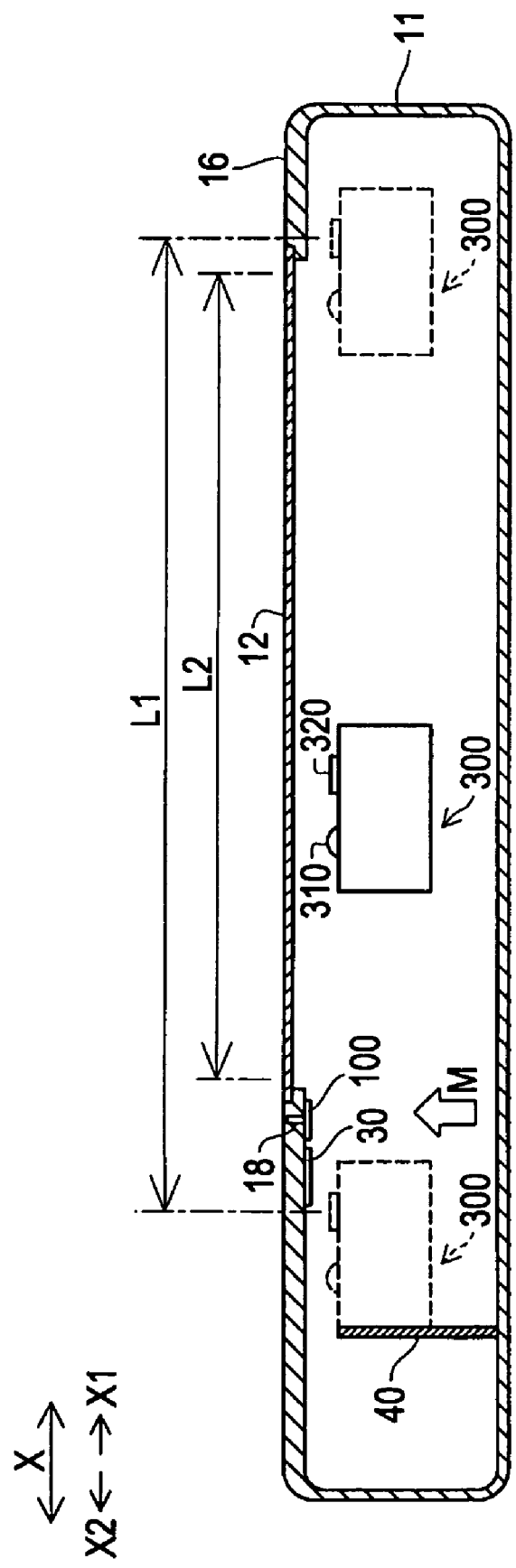
FIG. 4 is a cross-sectional view that schematically shows the internal mechanism of the scanner.

FIG. 4 is a cross-sectional view that schematically shows the internal mechanism of the scanner 10. Among the internal configuration of the scanner 10 shown in FIG. 2, the guide rail 210, the timing belt 222, the stepping motor 226, the control unit 230, the flat cable 240, the power supply unit 250, and the like, are not shown in FIG. 4. The carriage 300 is able to move in the sub-scanning forward direction (X1 direction in FIG. 4) to a position (hereinafter, referred to as "forward direction side limit position") at which the carriage 300 is indicated by the broken line to the right hand side in FIG. 4, and is able to move in the sub-scanning reverse direction (X2 direction in FIG. 4) to a position (hereinafter, referred to as "reverse direction side limit position") at which the carriage 300 is indicated by the broken line to the left hand side in FIG. 4. That is, the carriage 300 is able to reciprocally move in the sub-scanning direction within the limit in which the light receiving unit 320 of the carriage 300 is positioned inside the range of the length L1 indicated in FIG. 2 and FIG. 4. Thus, as shown in FIG. 2, the carriage 300 is able to optically read an object within a readable region 400 that is defined by the range of the width W1 in the main scanning direction and the range of the length L1 in the sub-scanning direction. Note that, as shown in FIG. 4, the carriage 300 is placed at the reverse direction side limit position in a state where the carriage 300 is in contact with the plate-like stop plate 40 that is fixed to the case 11 and extends in the main scanning direction.

In addition, as shown in FIG. 4, the range in the sub-scanning direction, in which the carriage 300 is able to read an original, which serves as a reading object, mounted on the original mounting plate 12, is the range of a length L2. This range of the length L2 is included in the range of the length L1. As shown in FIG. 2, the carriage 300 is able to optically read an original mounted on the original mounting plate 12 within an original reading region 500 that is defined by the range of the width W1 in the main scanning direction and the range of the length L2 in the sub-scanning direction.

Figure 5:
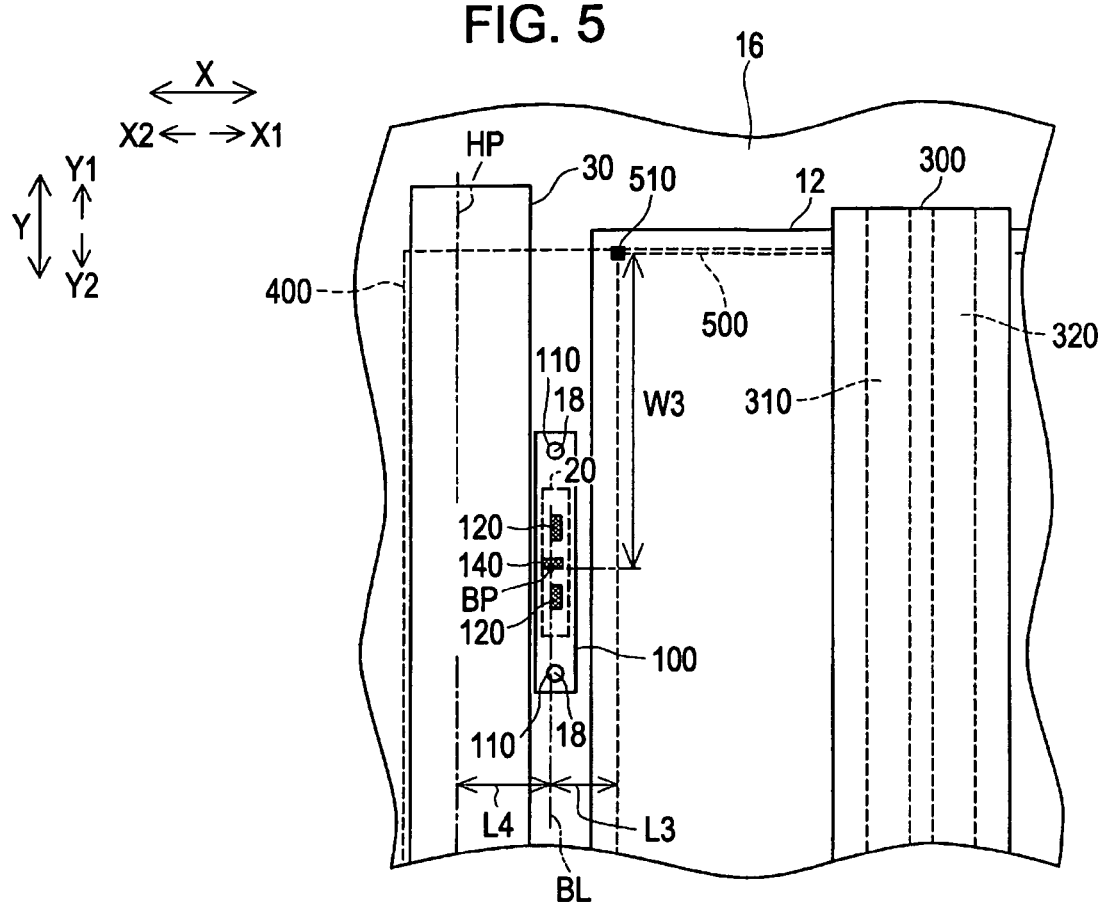
FIG. 5 is a partially enlarged plan view of the scanner when viewed from the inside of a case.
Figure 6:
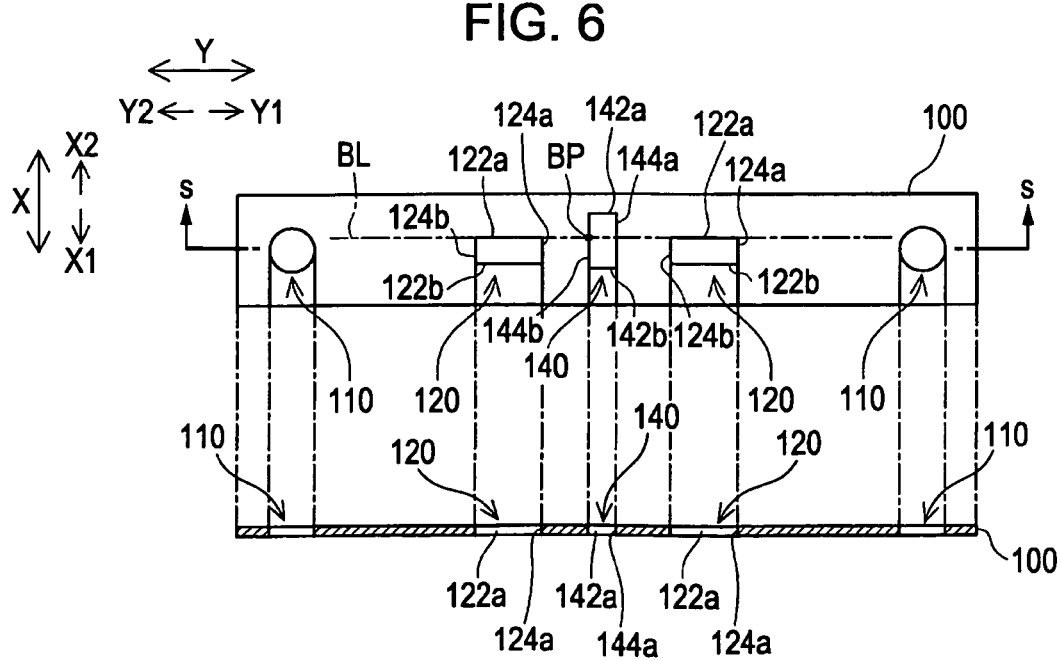
FIG. 6 is a view that illustrates the planar configuration and cross-sectional configuration of a reference position specifying plate in detail.

As shown in FIG. 4, a reference position specifying plate 100 and a white reference plate 30 are provided on the inner surface of the support portion 16. FIG. 5 is a partially enlarged plan view of the scanner 10 when viewed from the inside of the case 11. FIG. 5 is a plan view that shows a portion of the scanner 10 when viewed in the direction indicated by the arrow M in FIG. 4. In addition, FIG. 6 is a view that illustrates the planar configuration and cross-sectional configuration of the reference position specifying plate 100 in detail. FIG. 6 shows a plan view when the reference position specifying plate 100 is viewed in the direction indicated by the arrow M in FIG. 4 and also shows the cross-sectional view taken along the line s-s in the drawing that shows the plan view.

The reference position specifying plate 100 is a substantially rectangular flat plate with a color having a high reflectance (for example, white). The reference position specifying plate 100 is, for example, formed of polypropylene or polystyrene. As shown in FIG. 5, the reference position specifying plate 100 is arranged inside the readable region 400 and located to the side in the sub-scanning reverse direction (X2 direction) with respect to the original reading region 500.

As shown in FIG. 6, the reference position specifying plate 100 includes a pair of substantially circular positioning holes 110, a pair of rectangular first reference mark holes 120, and a single rectangular second reference mark hole 140. The positioning holes 110, the first reference mark holes 120 and the second reference mark hole 140 all are holes that extend through the reference position specifying plate 100 in a direction perpendicular to the plane of the reference position specifying plate 100. The pair of positioning holes 110 are respectively arranged around both end portions of the reference position specifying plate 100 in the main scanning direction, and the second reference mark hole 140 is arranged around the center of the plane of the reference position specifying plate 100. In addition, the pair of first reference mark holes 120 are arranged in the main scanning direction at positions that are located on both sides of the second reference mark hole 140.

The positioning holes 110, the first reference mark holes 120 and the second reference mark hole 140 are, for example, formed by means of presswork that uses a die or machinework, so that the positional relationship among these holes is accurate. That is, in the reference position specifying plate 100, the positions of the first reference mark holes 120 and the second reference mark hole 140 are accurately determined with respect to the positions of the positioning holes 110.

The reference position specifying plate 100 is attached to a predetermined position of the inner surface of the support portion 16 at the positions of the positioning holes 110 with flat countersunk head screws 18 (see FIG. 4). Note that a method of attaching the reference position specifying plate 100 to the support portion 16 is not limited to the method using the flat countersunk head screws 18; however, for example, the reference position specifying plate 100 may be attached to the support portion 16 using adhesive agent in a state where protrusions provided on the surface of the support portion 16 are inserted in the positioning holes 110.

As shown in FIG. 6, the rectangular first reference mark holes 120 are arranged so that, when the reference position specifying plate 100 is attached to the support portion 16, two first edges 122 (122a and 122b) are substantially parallel to the main scanning direction, and two second edges 124 (124a and 124b) perpendicular to the first edges 122 are substantially parallel to the sub-scanning direction. In addition, the positions of the two first reference mark holes 120 in the sub-scanning direction are located at substantially the same position. That is, the first edges 122a, which are located to the side in the sub-scanning reverse direction (X2 direction), of the two first reference mark holes 120 both are positioned on a predetermined straight line BL (hereinafter, referred to as "reference line BL").

Similarly, as shown in FIG. 6, the rectangular second reference mark hole 140 is arranged so that, when the reference position specifying plate 100 is attached to the support portion 16, two first edges 142 (142a and 142b) are substantially parallel to the main scanning direction, and two second edges 144 (144a and 144b) perpendicular to the first edges 142 are substantially parallel to the sub-scanning direction. The first edge 142a, which is located to the side in the sub-scanning reverse direction (X2 direction), of the second reference mark hole 140 is positioned to the side in the sub-scanning reverse direction (X2 direction) with respect to the reference line BL, and the first edge 142b, which is located to the side in the sub-scanning forward direction (X1 direction), is positioned to the side in the sub-scanning forward direction (X1 direction) with respect to the reference line BL. Thus, the second edge 144b, which is located to the side in the main scanning reverse direction (Y2 direction), intersects the reference line BL. The point at which the second edge 144b intersects with the reference line BL is termed as "reference point BP".

As shown in FIG. 5, a colored region 20 is set at a position at which the reference position specifying plate 100 is attached on the inner surface of the support portion 16. The inner surface of the support portion 16 is colored with a color having a low reflectance (for example, black) in the colored region 20. The colored region 20 has a region that faces the first reference mark holes 120 and the second reference mark hole 140 when the reference position specifying plate 100 is attached. Thus, as the reference position specifying plate 100 is attached to the support portion 16, the colored region 20 is exposed to the outside through the first reference mark holes 120 and the second reference mark hole 140.

On the inner surface of the support portion 16, a pattern (hereinafter, referred to as "reference pattern") in which a region having a color with a high reflectance (for example, white) and a region having a color with a low reflectance (for example, black) are alternately arranged along the main scanning direction is formed by the reference position specifying plate 100 and the colored region 20. The reference pattern will be a pattern of which the color contrast is large between the adjacent regions in the main scanning direction. The region on the inner surface of the support portion 16, in which the reference pattern is formed, may be regarded as a pattern region according to the aspects of the invention. Note that, instead of the colored region 20, the reference pattern may be formed using a sheet colored with black.

The reference line BL and the reference point BP in the reference pattern are used as a reference position for specifying the position of the original reading region 500. More specifically, as shown in FIG. 5, a point that is spaced a distance L3 in the sub-scanning forward direction (X1 direction) from the reference line BL and that is spaced a distance W3 in the main scanning forward direction (Y1 direction) from the reference point BP is specified as a reading region reference point 510 of the original reading region 500. The reading region reference point 510 is a vertex of the rectangular original reading region 500 to the side in the main scanning forward direction (Y1 direction) and to the side in the sub-scanning reverse direction (X2 direction). When the position of the reading region reference point 510 is specified, the position of the original reading region 500 is specified on the basis of the size in the main scanning direction and sub-scanning direction (W1 or L2, see FIG. 2) of the original reading region 500. That is, the reference pattern may be a pattern that defines a reference position (the position of the reference line BL and the position of the reference point BP) for specifying the position of the original reading region 500.

In addition, in the scanner 10 according to the present embodiment, the home position of the carriage 300 may also be defined by the reference pattern. Here, the home position of the carriage 300 is a standby position of the carriage 300 when reading of an original is not performed by the carriage 300. In the present embodiment, the home position of the carriage 300 is set to a position at which the light receiving unit 320 of the carriage 300 faces the white reference plate 30. In FIG. 5, the position of the light receiving unit 320 when the carriage 300 is located at the home position is indicated by alternate long and short dashed line with the reference sign HP. The position of the light receiving unit 320 when the carriage 300 is located at the home position is set as a position that is spaced a distance L4 in the sub-scanning reverse direction (X2 direction) from the reference line BL of the reference pattern.

The white reference plate 30 is a white, substantially rectangular flat plate and is, for example, formed of polypropylene or polystyrene. As shown in FIG. 4 and FIG. 5, the white reference plate 30 is arranged at a position to the side in the sub-scanning reverse direction (X2 direction) with respect to the reference position specifying plate 100. The position of the white reference plate 30 is set on the basis of the relationship with the reference pattern of the reference position specifying plate 100 or with the home position of the carriage 300. The size of the white reference plate 30 in the sub-scanning direction is set to a size that is included in the readable region 400, and the size of the white reference plate 30 in the main scanning direction is set to a value that is larger than the width W1 (see FIG. 2) of the readable region 400 in the main scanning direction. The white reference plate 30 is fixed to the inner surface of the support portion 16 by means of, for example, adhesive agent. Note that white color, which is the color of the white reference plate 30, may be regarded as a reference color according to the aspects of the invention, and the region, in which the white reference plate 30 is provided on the inner surface of the support portion 16, may be regarded as a reference color region according to the aspects of the invention.

A-2. Home Position Searching Process

Figure 7:
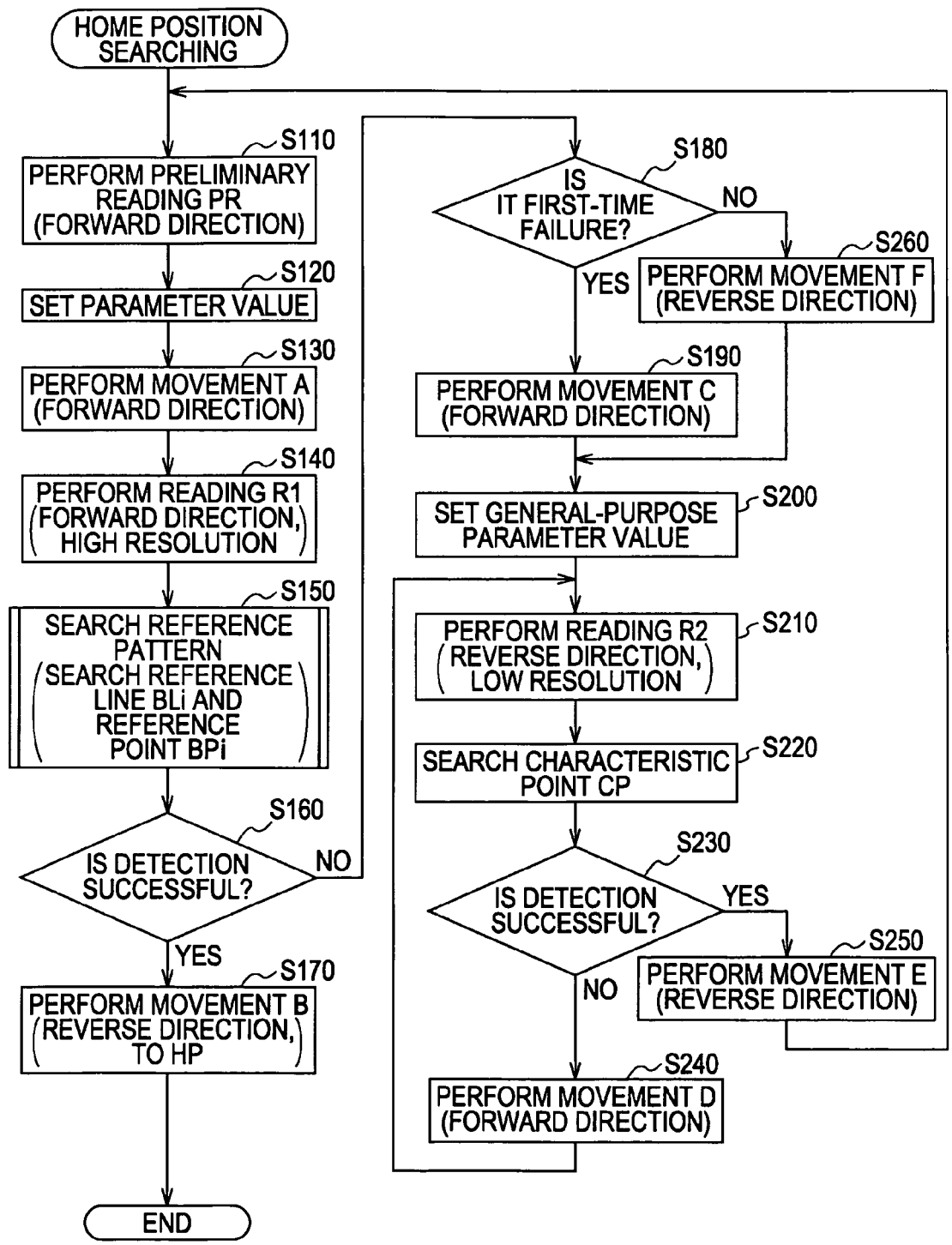
FIG. 7 is a flowchart that shows the flow of the home position searching process performed by the scanner according to the embodiment.
Figure 8:
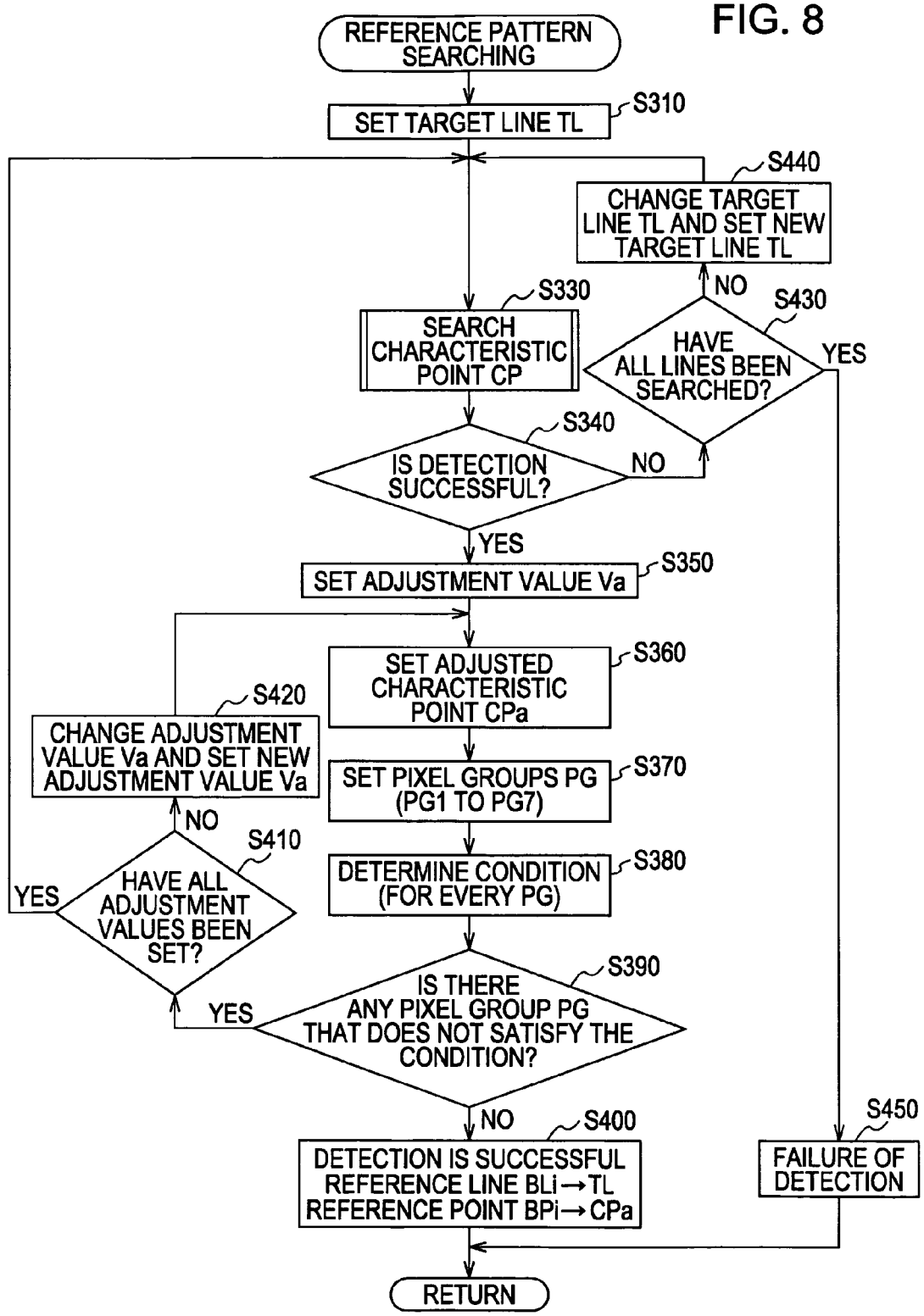
FIG. 8 is a flowchart that shows the flow of a reference pattern searching process in the home position searching process.
Figure 9:
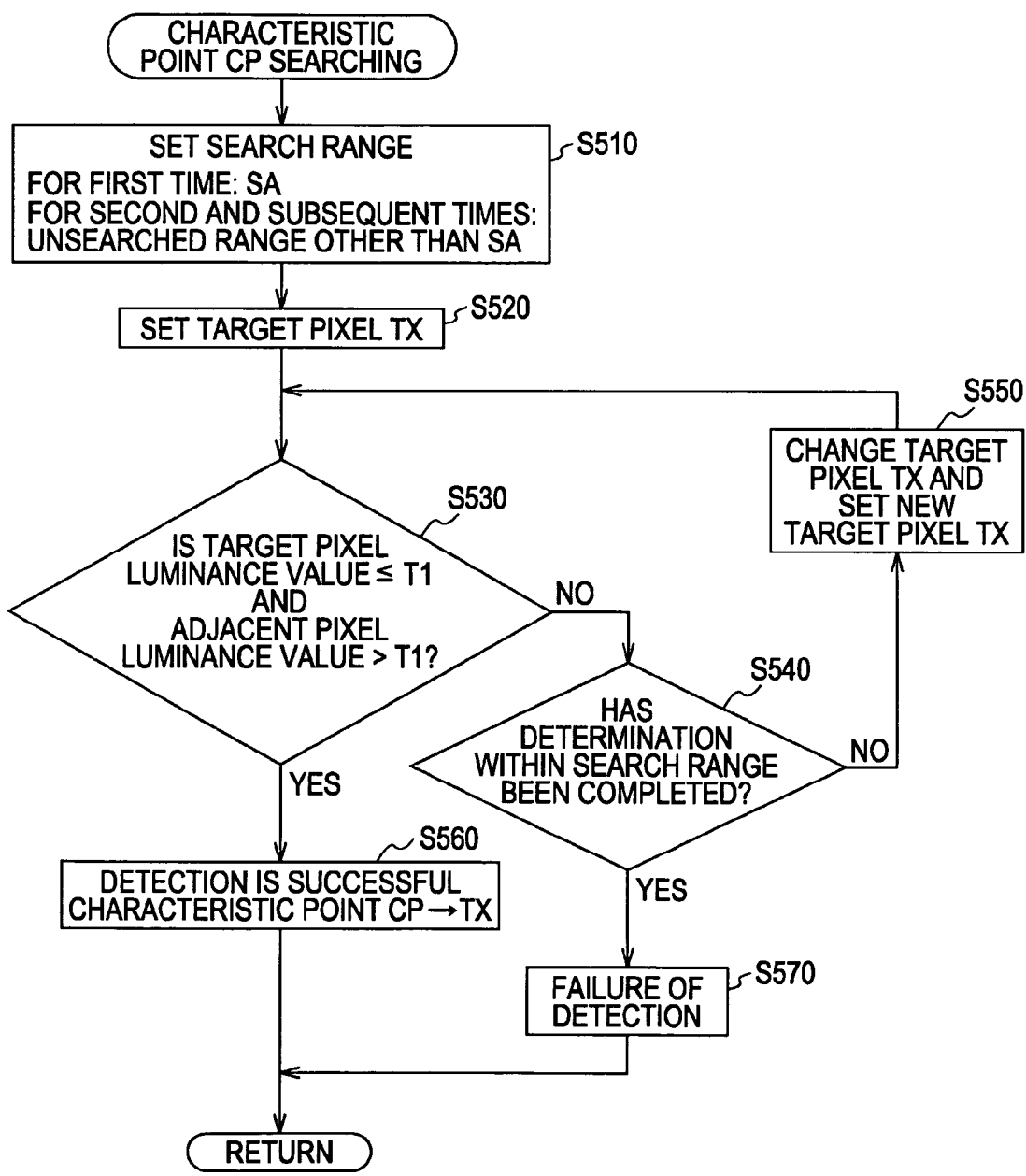
FIG. 9 is a flowchart that shows the flow of a characteristic point searching process in the home position searching process.

FIG. 7 is a flowchart that shows the flow of the home position searching process performed by the scanner 10 according to the embodiment. FIG. 8 is a flowchart that shows the flow of a reference pattern searching process in the home position searching process. FIG. 9 is a flowchart that shows the flow of a characteristic point searching process in the home position searching process. In addition, FIG. 10 to FIG. 13 are views that illustrate examples of movement of the carriage 300 in the home position searching process.

The home position searching process performed by the scanner 10 is a process in which the home position of the carriage 300 is searched on the basis of the reference position (the position of the reference line BL and the position of the reference point BP) in the reference pattern and then the carriage 300 is moved to the home position. The home position searching process is, for example, executed as a portion of an initializing process that is performed immediately after the power of the scanner 10 is turned on. Note that, in the scanner 10 according to the present embodiment, because the power is turned off after the carriage 300 is moved to the home position when the power is normally turned off, the carriage 300 is presumably positioned around the home position at the time when the home position searching process is initiated immediately after the power is turned on after the power has been normally turned off.

In step S110 (see FIG. 7), the preliminary read processing unit 262 (see FIG. 3) of the control unit 230 controls the carriage 300 and the stepping motor 226 (see FIG. 2) to thereby perform preliminary reading PR. The preliminary reading PR is a process in which a predetermined reading range is preliminarily read in order to set a value of a predetermined reading parameter, which is used when reading is performed by the scanner 10. The preliminary reading PR is a process that should be performed under the white reference plate 30 (see FIG. 5) so that the value of the reading parameter is set normally. In the preliminary reading PR, reading is performed while the carriage 300 is moved in the sub-scanning forward direction (X1 direction). Note that the above described predetermined reading parameter is a parameter that is used to correct output signals, which are transmitted from the light receiving elements 322 when reading is performed, in consideration of the influence of uneven amount of light, limb darkening, nonuniform sensitivity of the light receiving elements 322, and the like, and includes at least one of the lighting-up time of the light emitting unit 310, the offset value of an analog front end, and shading data.

Figure 10:
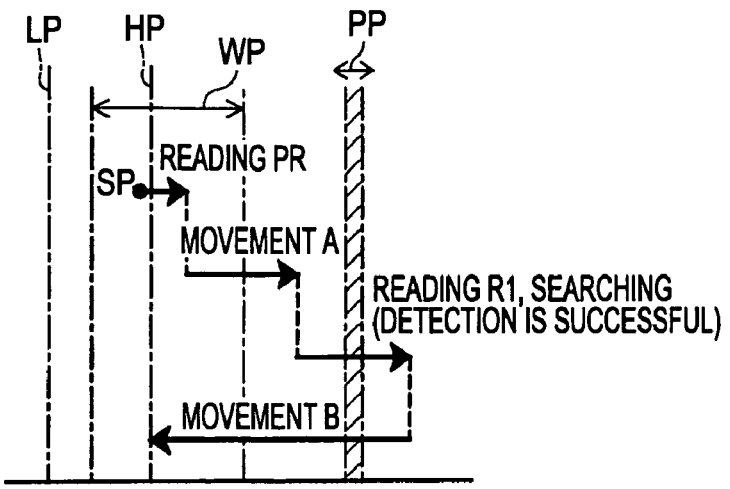
FIG. 10 is a view that illustrates an example of movement of a carriage in the home position searching process.

Among FIG. 10 to FIG. 13 in which the movement of the carriage 300 in the home position searching process is shown, FIG. 10 shows the movement of the carriage 300 when the position of the carriage 300 at the time when the home position searching process is initiated (hereinafter, referred to as "initial carriage position SP") is located around the home position, which is the normal position. Note that, in FIG. 10 to FIG. 13, LP denotes the position of the light receiving unit 320 when the carriage 300 is located at the reverse direction side limit position (see FIG. 4), HP denotes the position of the light receiving unit 320 when the carriage 300 is located at the home position, PP denotes the position of the reference pattern in the sub-scanning direction, and WP denotes the position of the white reference plate 30 in the sub-scanning direction. As shown in FIG. 10, when the initial carriage position SP is located around the home position, the white reference plate 30 may be read through the preliminary reading PR.

Figure 11:
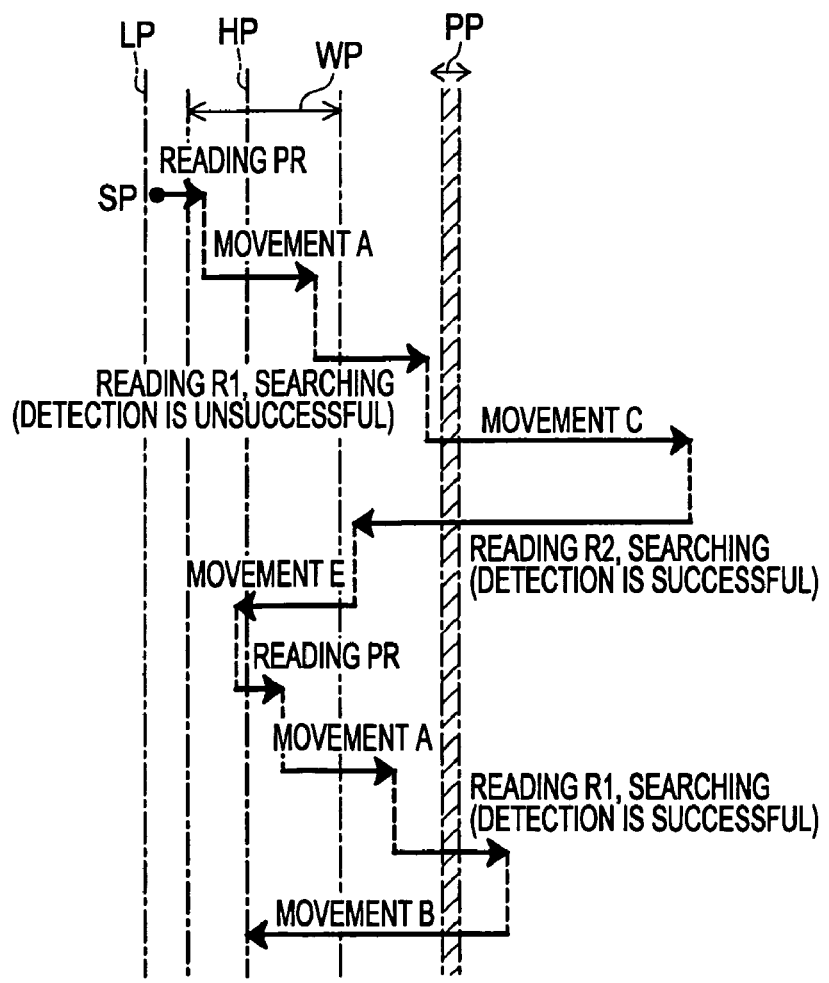
FIG. 11 is a view that illustrates an example of movement of the carriage in the home position searching process.
Figure 12:
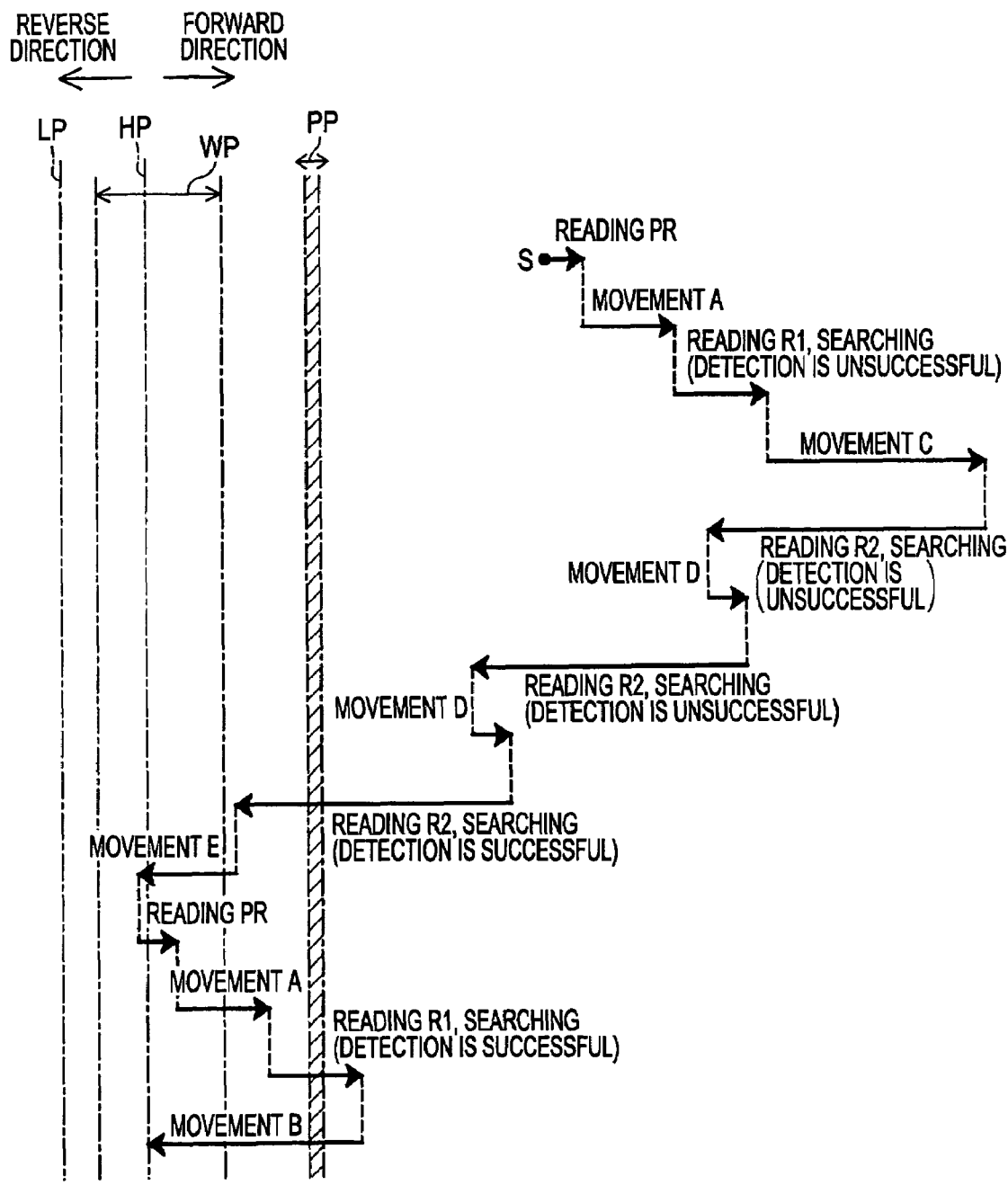
FIG. 12 is a view that illustrates an example of movement of the carriage in the home position searching process.
Figure 13:
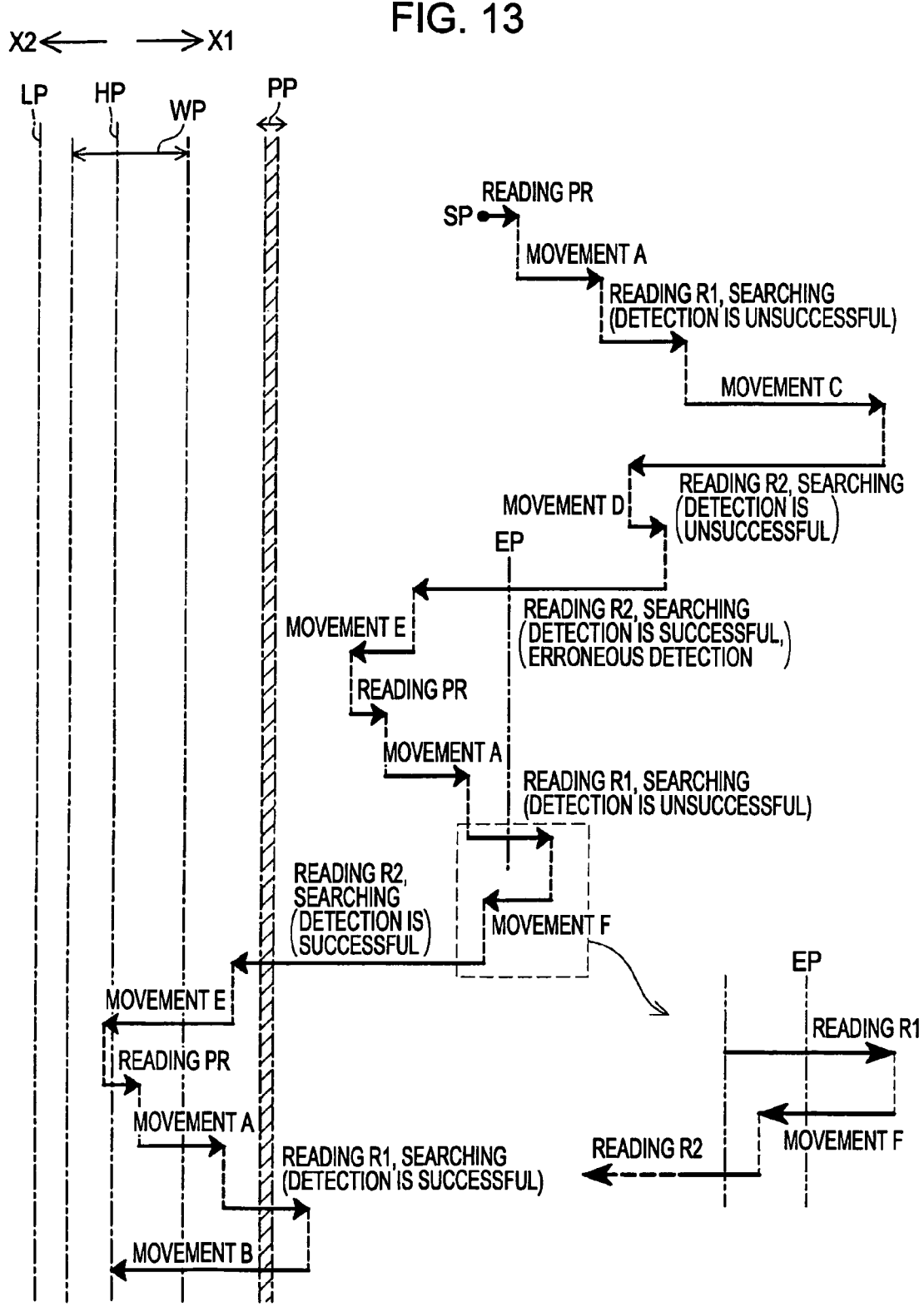
FIG. 13 is a view that illustrates an example of movement of the carriage in the home position searching process.

On the other hand, for example, as in the case after the power is turned off because of abnormal end, there may be a case in which the initial carriage position SP deviates by a large amount from the home position to the side in the sub-scanning reverse direction (X2 direction) (see FIG. 11) or a case in which the initial carriage position SP deviates by a large amount from the home position to the side in the sub-scanning forward direction (X1 direction) (see FIG. 12 and FIG. 13). When the initial carriage position SP deviates by a large amount from the home position, there is a possibility that a range outside the range in which the white reference plate 30 is positioned may be read through the preliminary reading PR.

In step S120 (see FIG. 7), the parameter setting unit 264 (see FIG. 3) of the control unit 230 sets the value of the reading parameter on the basis of the read result of the preliminary reading PR. The value of the reading parameter is set on the basis of the relationship between the read result of the preliminary reading PR and the color of the white reference plate 30, that is, white color, which serves as the reference color. More specifically, the parameter setting unit 264 calculates and determines the reading parameter to a value such that the output signal from each light receiving element 322 in the preliminary reading PR is corrected to a signal that indicates white color. Note that, because the value of the reading parameter is set in this manner, when the initial carriage position SP deviates by a large amount from the home position (see FIG. 11 to FIG. 13), there is a possibility that the set value of the reading parameter will not be an appropriate value.

In step S130 (see FIG. 7), the control unit 230 (see FIG. 3) moves the carriage 300 by a predetermined amount of movement in the sub-scanning forward direction (X1 direction). The movement of the carriage 300 in step S130 is represented by "movement A". The amount of movement in the sub-scanning forward direction in the movement A is set to an amount by which, when the initial carriage position SP is located around the home position (see FIG. 10), the carriage 300 moves from a position at which the preliminary reading PR is completed to a position immediately in front of the reference pattern.

In step S140 (see FIG. 7), the first image acquisition unit 266 (see FIG. 3) of the control unit 230 instructs the carriage 300 to perform reading while moving in the sub-scanning forward direction (X1 direction) to thereby generate read image data that represent a read image I1. The reading in step S140 is represented by "reading R1". The image data generated by the reading R1 may be regarded as first image data according to the aspects of the invention.

The amount of movement in the sub-scanning forward direction (X1 direction) in the reading R1 is set to an amount of movement by which, when the initial carriage position SP is located around the home position and the white reference plate 30 is read through the preliminary reading PR, the reference pattern is read through the reading R1. Thus, when the initial carriage position SP is located around the home position (see FIG. 10), the read image I1 generated through the reading R1 will be an image that includes an image of the reference pattern. On the other hand, when the initial carriage position SP deviates by a large amount from the home position (see FIG. 11 to FIG. 13), there is a possibility that the read image I1 will be an image that does not include the image of the reference pattern.

Figure 14:
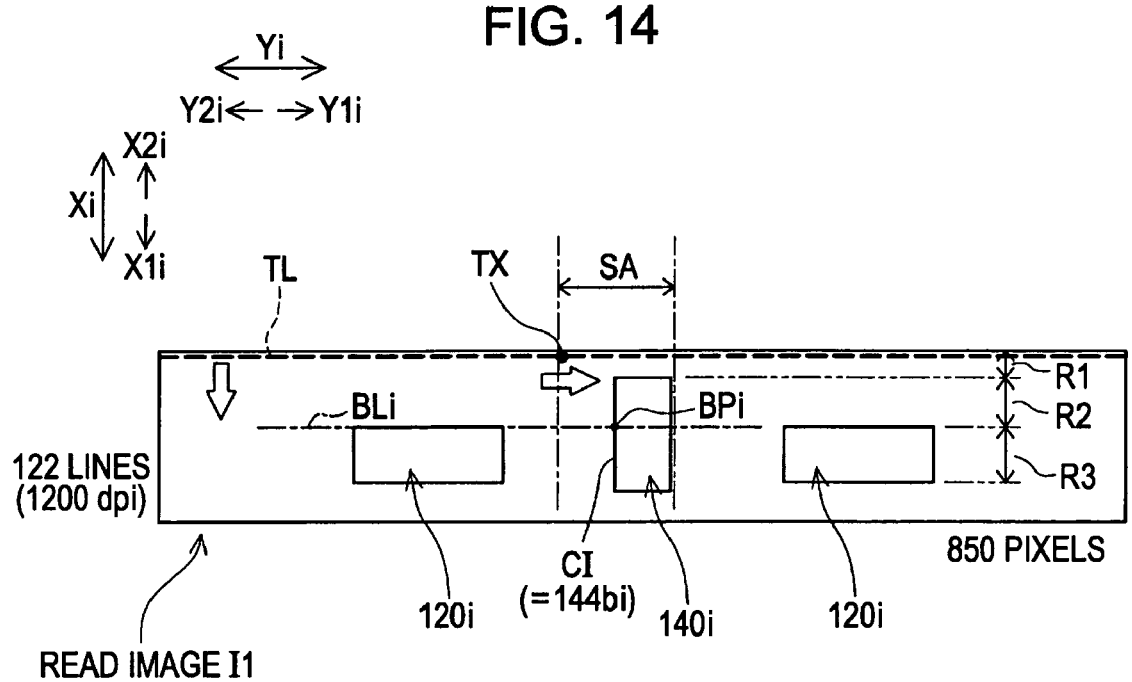
FIG. 14 is a view that illustrates an example of a read image that is generated through reading R1.

FIG. 14 is a view that illustrates an example of the read image I1 that is generated through the reading R1. In the example of the read image I1 shown in FIG. 14, the image of the reference pattern is included in the read image I1. That is, the read image I1 includes images 120$i$ of the first reference mark holes 120 (see FIG. 6) and an image 140$i$ of the second reference mark hole 140 in the reference pattern.

As shown in FIG. 14, the size of the read image I1 is, for example, a size of 850 pixels in a direction (Yi direction in FIG. 14) corresponding to the main scanning direction of the scanner 10 and 122 pixels in a direction (Xi direction in FIG. 14) corresponding to the sub-scanning direction of the scanner 10. In the present embodiment, a line composed of 850 pixels that are aligned along the direction (Yi direction) corresponding to the main scanning direction is termed as a pixel line (or a pixel column). The read image I1 may be regarded as an image that is composed of 122 pixel lines. Note that, in the present embodiment, the resolution of the read image I1 along the direction corresponding to the main scanning direction is 1200 dpi (Yi direction). In addition, the resolution of the read image I1 along the direction corresponding to the sub-scanning direction is 1200 dpi (Xi direction), which is higher than the resolution (300 dpi) of a read image I2, which is generated through reading R2, which will be described later, along the direction corresponding to the sub-scanning direction. Note that the resolution of the read image I1 along the direction corresponding to the sub-scanning direction (Xi direction) may be regarded as a first sub-scanning direction resolution according to the aspects of the invention.

Note that, in the read image I1 and the read image I2, which will be described later, the direction corresponding to the main scanning direction of the scanner 10 (Yi direction in FIG. 14) is termed as "main scanning corresponding direction", the direction corresponding to the main scanning forward direction of the scanner 10 (Y1$i$ direction in FIG. 14) is termed as "main scanning forward corresponding direction", and the direction corresponding to the main scanning reverse direction of the scanner 10 (Y2$i$ direction in FIG. 14) is termed as "main scanning reverse corresponding direction". In addition, the direction corresponding to the sub-scanning direction of the scanner 10 (Xi direction in FIG. 14) is termed as "sub-scanning corresponding direction", the direction corresponding to the sub-scanning forward direction of the scanner 10 (X1$i$ direction in FIG. 14) is termed as "sub-scanning forward corresponding direction", and the direction corresponding to the sub-scanning reverse direction of the scanner 10 (X2$i$ direction in FIG. 14) is termed as "sub-scanning reverse corresponding direction".

In step S150 (see FIG. 7), the pattern searching unit 270 (see FIG. 3) of the control unit 230 searches the image of the reference pattern from the read image I1. More specifically, the pattern searching unit 270 searches the image BLi of the reference line BL (see FIG. 6) and the image BPi of the reference point BP in the reference pattern from the read image I1.

In FIG. 8 that shows the flow of a process in which the image of the reference pattern is searched, in step S310 the pixel column selection unit 272 (see FIG. 3) of the pattern searching unit 270 sets a target line TL. The pixel column selection unit 272 selects a pixel line that is positioned farthest in the sub-scanning reverse corresponding direction (X2$i$ direction) in the read image I1 (see FIG. 14) as the target line TL.

In step S330 (see FIG. 8), the characteristic portion searching unit 274 (see FIG. 3) of the pattern searching unit 270 searches a characteristic point CP in the target line TL. Here, the characteristic point CP is a point that constitutes a characteristic image CI, which is an image that represents the characteristic portion of the reference pattern. In the present embodiment, the second edge 144$b$ of the second reference mark hole 140 (see FIG. 6) to the side in the main scanning reverse direction (Y2 direction) in the reference pattern is used as the characteristic portion. Thus, as shown in FIG. 14, the characteristic image CI will be an image 144$bi$ that represents the second edge 144*b* of the second reference mark hole 140 to the side in the main scanning reverse direction. Note that, because the characteristic portion of the reference pattern is a boundary portion between a portion with a color having a high reflectance (the reference position specifying plate 100) and a portion with a color having a low reflectance (the colored region 20 that is exposed through the second reference mark hole 140), the characteristic image CI will be an image of the boundary between an image having a high luminance value and an image having a low luminance value.

In FIG. 9 that shows the flow of a process in which the characteristic point CP is searched, in step S510 the characteristic portion searching unit 274 (see FIG. 3) sets a portion of the range on the target line TL as a search range in which the characteristic point CP is searched. In the present embodiment, when the characteristic point CP is searched for a certain target line TL for the first time, an initial search range SA shown in FIG. 14 is set as a search range. The initial search range SA is set in advance in consideration of the relationship between the reference pattern and the carriage 300 so that the initial search range SA is a range that includes a position at which the characteristic image CI should be positioned when the read image I1 is an image that includes the image of the reference pattern. On the other hand, as will be described later, when the characteristic point CP is searched in the certain target line TL for the second and subsequent times, unsearched range within the initial search range SA is set as a search range.

In step S520 (see FIG. 9), the characteristic portion searching unit 274 (see FIG. 3) sets a target pixel TX in the search range on the target line TL that is set in step S510. Specifically, the characteristic portion searching unit 274 sets a pixel that is positioned farthest in the main scanning reverse corresponding direction (Y2*i* direction in FIG. 14) in the search range on the target line TL as the target pixel TX.

In step S530 (see FIG. 9), the characteristic portion searching unit 274 determines whether the target pixel TX satisfies a predetermined condition. Here, the predetermined condition is that the luminance value of the target pixel TX is equal to or lower than a first threshold value T1 and the luminance value of a pixel adjacent to the target pixel TX in the main scanning reverse corresponding direction (Y2*i* direction) is higher than the first threshold value T1. When it is determined that the above predetermined condition is satisfied (Yes in step S530), the target pixel TX is determined as the characteristic point CP (step S560).

Figure 15:
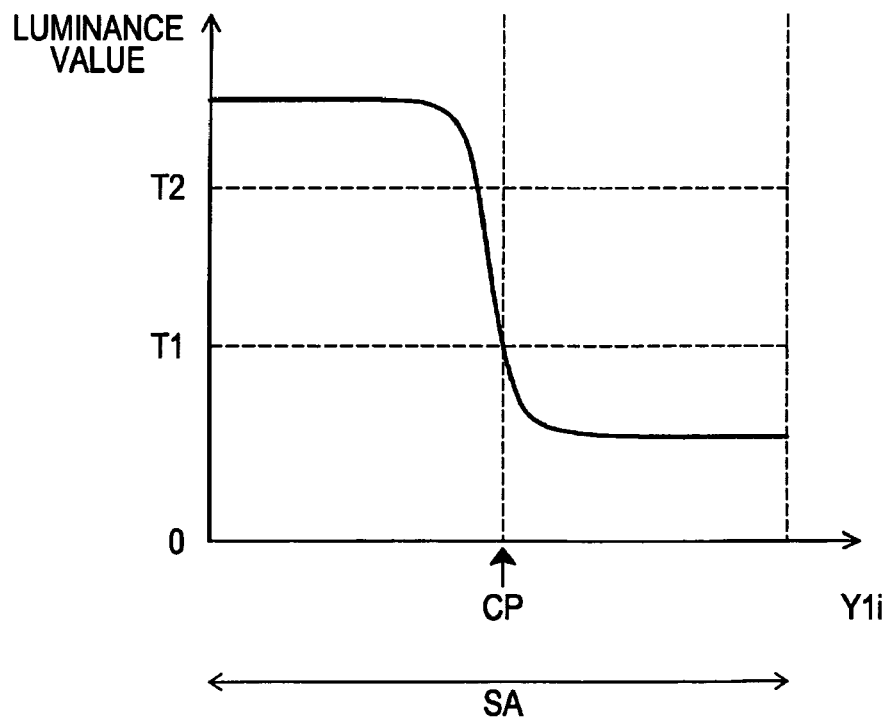
FIG. 15 is a view that illustrates a method of detecting a characteristic point using a predetermined condition.

FIG. 15 is a view that illustrates a method of detecting the characteristic point CP using the predetermined condition. As shown in FIG. 15, in the initial search range SA on the target line TL, it may be conceived that a position at which the luminance value steeply varies from a large value to a small value is the characteristic point CP corresponding to the characteristic image CI. Thus, when the first threshold value T1 is set to a low value corresponding to a color having a low reflectance (for example, 100 when the maximum luminance value is 255), it may be conceived that a point at which the above predetermined condition is satisfied is the characteristic point CP.

When it is determined that the predetermined condition is not satisfied (No in step S530), the characteristic portion searching unit 274 determines whether determination in step S530 has been completed over all the pixels within the set search range (step S540). When there is a pixel for which determination in step S530 has not been performed (No in step S540), the characteristic portion searching unit 274 changes the target pixel TX and sets a pixel adjacent to the pixel, which is currently set as the target pixel TX, in the main scanning forward corresponding direction (Y1*i* direction) as a new target pixel TX (step S550), and then performs determination in step S530 again. In this manner, along the main scanning forward corresponding direction (Y1*i* direction), each of the pixels on the target line TL is sequentially selected as the target pixel TX and determination in step S530 is then performed.

In step S540, when it is determined that determination in step S530 has been completed over all the pixels within the search range (Yes in step S540), the characteristic portion searching unit 274 determines that detection of the characteristic point CP in the target line TL has failed (step S570).

Referring back to FIG. 8, in step S330, when no characteristic point CP has been detected (No in step S340), the pattern searching unit 270 (see FIG. 3) of the control unit 230 determines whether all the pixel lines in the read image I1 have been selected as the target line TL, for which the characteristic point CP is searched (step S430). When there is a pixel line that has not been selected as the target line TL (No in step S430), the pixel column selection unit 272 (see FIG. 3) changes the target line TL and sets a pixel line adjacent to the pixel line, which is currently set as the target line TL, in the sub-scanning forward corresponding direction (X1*i* direction) as a new target line TL (step S440). As the target line TL is changed and then set, the process to detect the characteristic point CP in step S330 is performed again on the new target line TL. In this manner, along the sub-scanning forward corresponding direction (X1*i* direction), each of the pixel lines that constitute the read image I1 is sequentially selected as the target line TL and the process to detect the characteristic point CP is then performed.

In step S430, when it is determined that searching of the characteristic point CP in step S330 has been completed over all the pixel lines that constitute the read image I1 (Yes in step S430), the pattern searching unit 270 (see FIG. 3) determines that detection of the image of the reference pattern from the read image I1 has failed (step S450)

In the process to search the characteristic point CP in step S330, when the image of the reference pattern is included in the read image I1, it may be conceived that, within the range R1 of the read image I1 shown in FIG. 14, the characteristic point CP will not be detected from the target line TL. On the other hand, within the range R2 and R3 shown in FIG. 14, it may be conceived that the characteristic point CP will be detected from the target line TL. On the other hand, when the image of the reference pattern is not included in the read image I1, it may be conceived that no characteristic point CP will be detected. However, in each case, because, in the present embodiment, detection of the characteristic point CP is performed through determination using a relatively simple condition shown in step S530 in FIG. 9, there is a possibility that a point that does not correspond to the characteristic image CI may be erroneously detected as the characteristic point CP because of dirt, noise, or the like.

When the characteristic point CP has been detected in step S330 (see FIG. 8) (Yes in step S340), the adjustment unit 278 (see FIG. 3) of the control unit 230 sets an adjustment value Va (step S350). Here, the adjustment value Va is a value for adjusting the position of the detected characteristic point CP in the main scanning corresponding direction (Yi direction).

Figures 16, 17:
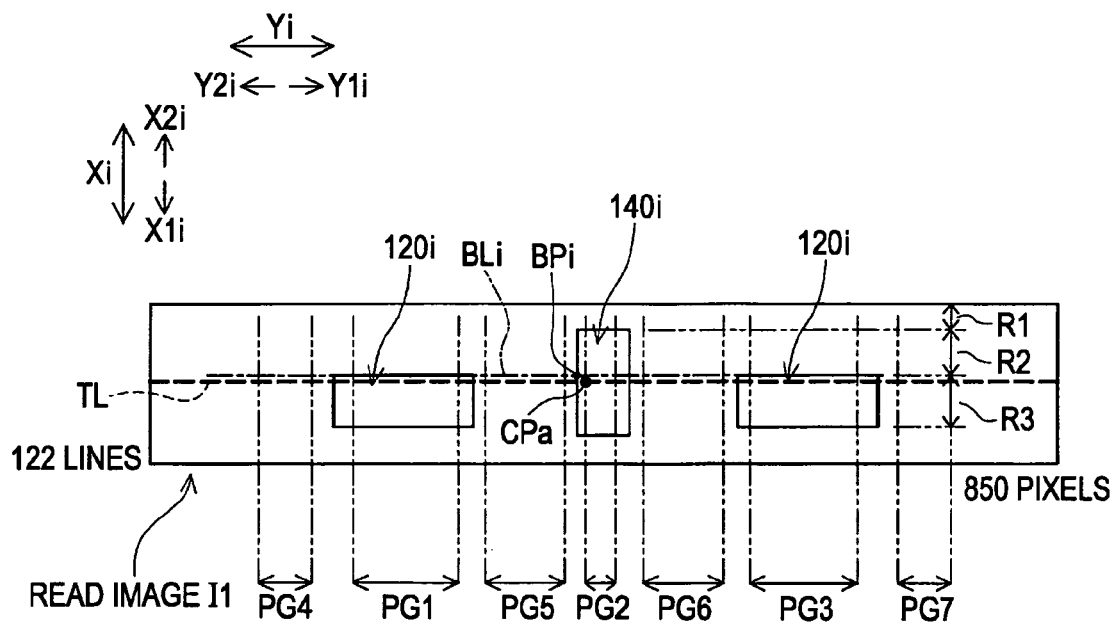
FIG. 16 is a view that illustrates an example of the content of an adjustment value table.
FIG. 17 is a view that illustrates a method of setting pixel groups.

Setting of the adjustment value Va is performed using the adjustment value table VT (see FIG. 3). FIG. 16 is a view that illustrates an example of the content of the adjustment value table VT. As shown in FIG. 16, in the present embodiment, the adjustment value Va in accordance with the number of times the adjustment value Va has been set is defined by the number of pixels. For example, when the set number of times is 0, that is, the adjustment value Va is set for the first time, the adjustment value Va is set to 0 pixel, and then adjustment of the position of the characteristic point CP in the main scanning corresponding direction is not performed. In addition, when the set number of times is 1, the adjustment value Va is set to +1 pixel, that is, a value such that the position of the characteristic point CP is moved by one pixel in the main scanning forward corresponding direction (Y1$i$ direction). In addition, when the set number of times is 2, the adjustment value Va is set to −1 pixel, that is, a value such that the position of the characteristic point CP is moved by one pixel in the main scanning reverse corresponding direction (Y2$i$ direction). Note that the adjustment values Va for the set number of times up to 10 are defined in the adjustment value table VT.

In step S360 (see FIG. 8), the adjustment unit 278 (see FIG. 3) sets an adjusted characteristic point CPa. The adjusted characteristic point CPa is a point that is obtained in such a manner that the position of the characteristic point CP is adjusted in the main scanning corresponding direction on the basis of the adjustment value Va that is set in step S350.

In step S370 (see FIG. 8), the pixel group setting unit 276 (see FIG. 3) sets pixel groups PG on the target line TL on the basis of the adjusted characteristic point CPa. FIG. 17 is a view that illustrates a method of setting the pixel groups PG. As shown in FIG. 17, in the present embodiment, seven pixel groups PG (PG1 to PG7) corresponding to seven regions that constitute the reference pattern (see FIG. 6) are set. Here, the seven regions that constitute the reference pattern include three regions with a color having a low reflectance (portions corresponding to the two first reference mark holes 120 and the one second reference mark hole 140) and four regions with a color having a high reflectance (portions corresponding to the reference position specifying plate 100) adjacent to the above three regions.

In the present embodiment, the position of each pixel group PG in the main scanning corresponding direction (Yi direction) is set using the position of the adjusted characteristic point CPa as a reference in advance. For example, the position of the end of the pixel group PG2 to the side in the main scanning reverse corresponding direction (Y2$i$ direction) is set to the position of the adjusted characteristic point CPa, the position of the end of the pixel group PG2 to the side in the main scanning forward corresponding direction (Y1$i$ direction) is set to a position that is spaced 23 pixels from the adjusted characteristic point CPa in the Y1$i$ direction. Thus, the pixel group PG2 is a pixel group having 24 pixels. The positions of the other pixel groups PG are also set in the same manner. The position of each pixel group PG in the main scanning corresponding direction (Yi direction) is defined in advance on the basis of the relationship between the reference pattern and the carriage 300 so that, when the read image I1 includes the image of the reference pattern, the seven pixel groups PG (PG1 to PG7) correspond to the seven regions that constitute the reference pattern. Note that, as shown in FIG. 17, a gap of the predetermined number of pixels is provided between any adjacent pixel groups PG (for example, between PG1 and PG5).

In step S380 (see FIG. 8), the pattern searching unit 270 (see FIG. 3) performs determination of condition for each of the set pixel groups PG. The determination of condition is performed on whether, in regard to the pixel groups PG (PG1 to PG3) corresponding to the regions with a color having a low reflectance, the ratio of the number of pixels, of which the luminance value is equal to or lower than the first threshold value T1, to the number of all the pixels included in the pixel group PG is equal to or larger than a predetermined ratio (for example, 80 percentage). The pixel group PG that satisfies the above condition may be regarded as the one that represents the image of the region of the reference pattern with a color having a low reflectance. In addition, in regard to the pixel groups PG (PG4 to PG7) corresponding to the regions with a color having a high reflectance, the determination of condition is performed on whether the ratio of the number of pixels, of which the luminance value is equal to or larger than the second threshold value T2, to the number of all the pixels included in the pixel group PG is equal to or larger than a predetermined ratio (for example, 80 percentage). Here, the second threshold value T2 is set to a value corresponding to a color having a high reflectance (for example, 180 when the maximum luminance value is 255). The pixel group PG that satisfies the above condition may be regarded as the one that represents the image of the region of the reference pattern with a color having a high reflectance.

Note that the reason why the above condition is not set to whether the luminance value of all the pixels included in the pixel group PG is equal to or lower than the first threshold value T1 (or equal to or higher than the second threshold value T2) is to suppress omissions of detection of the reference pattern due to a strict condition in consideration of the influence of dirt, noise, or the like. In addition, a gap of the predetermined number of pixels is provided between any adjacent pixel groups PG as described above. This is also for the same reason.

The determination of condition is, for example, executed initially on the pixel group PG1 and, after that, sequentially performed in the order of PG2, PG3, PG4, PG5, PG6, and PG7. When it is determined that all seven pixel groups PG satisfy the condition (No in step S390), the pattern searching unit 270 (see FIG. 3) determines that detection of the image of the reference pattern is successful (step S400). That is, the pattern searching unit 270 determines the currently set target line TL as the image BLi corresponding to the reference line BL (see FIG. 6) of the reference pattern, and determines the adjusted characteristic point CPa as the image BPi corresponding to the reference point BP.

On the other hand, when at least one of the pixel groups PG does not satisfy the condition (Yes in step S390), irrespective of whether determination on other pixel groups PG has been executed, the determination of condition in step S380 is stopped. In this case, the adjustment unit 278 (see FIG. 3) determines whether all values defined in the adjustment value table VT (see FIG. 16) have been set as Va (step S410). When there is a value that has not been set as the adjustment value Va (No in step S410), the adjustment unit 278 changes the adjustment value Va and sets a new adjustment value Va (step S420). That is, the value in the column of which the set number of times is larger by one is set as a new adjustment value Va.

After that, on the basis of the newly set adjustment value Va, setting of the adjusted characteristic point CPa (step S360), setting of the pixel groups PG (step S370) and determination of condition for each of the pixel groups PG (step S380) are executed again. In this manner, while the positions of the seven pixel groups PG are minutely adjusted in the main scanning corresponding direction, searching of the image of the reference pattern using the pixel groups PG is executed. When all the values defined in the adjustment value table VT have been already set as the adjustment value Va (Yes in step S410), the process returns to searching of the characteristic point CP in step S330.

In this manner, in the process to search the image of the reference pattern in the read image I1 (see FIG. 8), the target line TL is sequentially set along the sub-scanning forward corresponding direction (X1$i$ direction) and searching of the characteristic point CP is then performed within the search range on the target line TL. When the characteristic point CP has been searched, on the target line TL, setting of the pixel groups PG and determination of condition for each of the pixel groups PG are performed. Thus, as shown in FIG. 17, when the target line TL is set within the range R1, it may be conceived that no characteristic point CP will be detected from the target line TL and, therefore, setting of the pixel groups PG or determination of condition will not be executed. On the other hand, when the target line TL is set within the range R2, the characteristic point CP will be detected from the target line TL; however, it will be determined that, in determination of condition for each of the pixel groups PG, the condition is not satisfied. When the target line TL is set within the range R3 for the first time, it may be conceived that the characteristic point CP will be detected from the target line TL and it will be determined that the condition is satisfied in determination of condition for each of the pixel groups PG. The target line TL at this time is used as the image BLi corresponding to the reference line BL, and the adjusted characteristic point CPa at this time is used as the image BPi corresponding to the reference point BP.

Note that, when a point that does not correspond to the characteristic image CI is erroneously detected as the characteristic point CP in searching of the characteristic point CP (step S330 in FIG. 8), detection of the image of the reference pattern will fail in the following determination of condition (step S380).

When the image of the reference pattern has been detected from the read image I1 (Yes in step S160) in step S150 of the home position searching process (see FIG. 7), the control unit 230 (see FIG. 3) moves the carriage 300 to the home position (step S170) and then completes the home position searching process. The movement of the carriage 300 in step S170 is represented by "movement B".

As shown in FIG. 5, the position of the light receiving unit 320 (the position indicated by HP in FIG. 5) at the home position of the carriage 300 is determined at a position that is spaced a distance L4 to the side in the sub-scanning reverse direction (X2 direction) from the reference line BL of the reference pattern. In addition, the control unit 230 recognizes the position of the image BLi corresponding to the reference line BL in the image of the reference pattern that has been detected in the read image I1. The control unit 230 calculates and determines the amount of movement through the movement B on the basis of the position of the image BLi in the read image I1 and accurately moves the carriage 300 to the home position (see FIG. 10).

On the other hand, when detection of the image of the reference pattern from the read image I1 in step S150 (see FIG. 7) has failed (No in step S160) and it is the first-time failure (Yes in step S180), the control unit 230 (see FIG. 3) moves the carriage 300 by a predetermined amount of movement in the sub-scanning forward direction (X1 direction) (step S190). The movement of the carriage 300 in step S190 is represented by "movement C".

As described above, when the initial carriage position SP deviates by a large amount from the home position (see FIG. 11 to FIG. 13), there is a possibility that the read image I1 may be an image that does not include the image of the reference pattern. In such a case, because detection of the image of the reference pattern from the read image I1 in step S150 fails, the movement C is performed as shown in FIG. 11 to FIG. 13. After that, searching of the position of the reference pattern will be performed through the processes described below.

In step S200 (see FIG. 7), the general-purpose value setting unit 282 (see FIG. 3) of the control unit 230 sets a value of the above described predetermined reading parameter, which is used for reading, to a general-purpose parameter value. The general-purpose parameter value is a value that is set in advance so that at least the characteristic point CP can be detected from image data, which are generated through reading of the reference pattern using the general-purpose parameter value, and is defined in the general-purpose value table AT (see FIG. 3).

In step S210 (see FIG. 7), the second image acquisition unit 284 (see FIG. 3) of the control unit 230 instructs the carriage 300 to perform reading using the set general-purpose parameter value while moving in the sub-scanning reverse direction (X2 direction) to thereby generate read image data that represent the read image I2. The reading in step S210 is represented by "reading R2". The image data generated by the reading R2 may be regarded as second image data according to the aspects of the invention.

Figure 18:
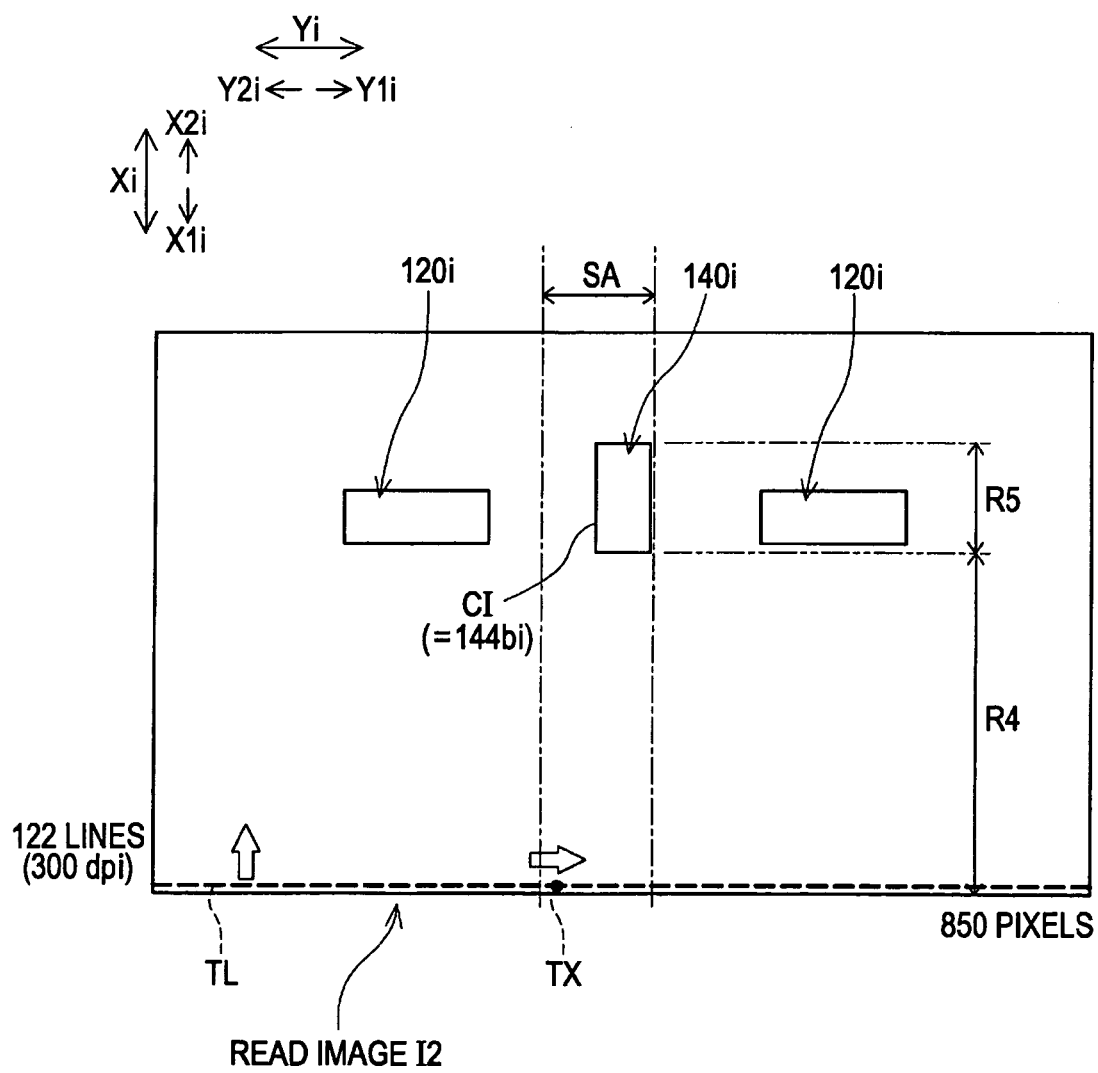
FIG. 18 is a view that illustrates an example of a read image that is generated through reading R2.

FIG. 18 is a view that illustrates an example of the read image I2 that is generated through the reading R2. As shown in FIG. 18, the size of the read image I2 is, for example, a size of 850 pixels in the main scanning corresponding direction (Yi direction) and 122 pixels in the sub-scanning corresponding direction (Xi direction). That is, the read image I2, as well as the read image I1 (see FIG. 14), is an image that is composed of 122 pixel lines. In addition, the resolution of the read image I2 along the main scanning corresponding direction (Yi direction) is 1200 dpi. However, the resolution of the read image I2 along the sub-scanning corresponding direction (Xi direction) is 300 dpi, which is lower than the resolution (1200 dpi) of the read image I1 in the sub-scanning corresponding direction. Note that the resolution of the read image I2 along the sub-scanning corresponding direction (Xi direction) is a resolution that is set in advance so that at least the characteristic point CP can be detected from the read image I2, which is generated through reading of the reference pattern in the resolution. Specifically, the resolution is set within a range such that a distance between the adjacent pixel lines along the sub-scanning corresponding direction is smaller than the size of the characteristic image CI along the sub-scanning corresponding direction. Note that the resolution of the read image I2 along the sub-scanning corresponding direction (Xi direction) may be regarded as a second sub-scanning direction resolution according to the aspects of the invention.

In step S220 (see FIG. 7), the pattern searching unit 270 (see FIG. 3) of the control unit 230 searches the characteristic point CP in the image data that represent the read image I2. The method of searching the characteristic point CP in step S220 is the same as the method of searching the characteristic point CP in the reference pattern searching process (see FIG. 8) in step S150. That is, the pixel column selection unit 272 sequentially selects each of the pixel lines that constitute that read image I2 as the target line TL, and the characteristic portion searching unit 274 searches the characteristic point CP in the search range (initial search range SA or unsearched range within the initial search range SA) on the target line TL. Searching of the characteristic point CP is performed for specifying a schematic position of the reference pattern. Note that, in searching of the characteristic point CP in the read image I2, selection of the pixel lines as the target line TL is sequentially performed from the pixel line that is located farthest in the sub-scanning forward corresponding direction (X1i direction), as shown in FIG. 18.

Here, because the read image I2 is an image that is generated through the reading R2 using the general-purpose parameter value, the read image I2 is not influenced by the position at which the preliminary reading PR is performed in step S110. In addition, the general-purpose parameter value is set so that at least the characteristic point CP can be detected from image data, which are generated through reading of the reference pattern using the general-purpose parameter value. Thus, irrespective of whether the preliminary reading PR is performed under the white reference plate 30, when the read image I2 is an image that includes the image of the reference pattern, the characteristic point CP will be detected from the target line TL within the range R5 shown in FIG. 18. However, even within the range R4 shown in FIG. 18 or in the read image I2 that does not include the image of the reference pattern, there is a possibility that the characteristic point CP may be erroneously detected because of the influence of dirt, noise, or the like.

When the characteristic point CP has been detected from the read image I2 (Yes in step S230), the control unit 230 (see FIG. 3) moves the carriage 300 to around the home position (step S250). The movement of the carriage 300 in step S250 is represented by "movement E" (see FIG. 11). At the time of step S250, the image BLi of the reference line BL of the reference pattern has not been detected from the read image I2; however, the characteristic point CP that indicates the schematic position of the image of the reference pattern has been detected. The control unit 230 calculates and determines the amount of movement through the movement E, through which the carriage 300 is moved to around the home position, on the basis of the position of the characteristic point CP in the read image I2.

After the movement E (step S250 in FIG. 7), the processes from step S110 to step S150 will be executed again (see FIG. 11). At this time, because the position of the carriage 300 at the time when the preliminary reading PR (step S110) is initiated is located around the home position, the image of the reference pattern will be detected in searching of the image of the reference pattern from the read image I1 (step S150). Thus, in this case, the carriage 300 is moved to the home position on the basis of the position of the detected image of the reference pattern (step S170), and then the home position searching process is completed.

Note that the control unit 230, when the characteristic point CP has been detected from the read image I2, that instructs the carriage 300 to move to around the home position and to perform the preliminary reading PR again may be regarded as a reprocessing instruction unit or a first reprocessing instruction unit according to the aspects of the invention.

On the other hand, when the characteristic point CP is not detected from the read image I2 in step S230 (see FIG. 7) (No in step S230), the control unit 230 (see FIG. 3) moves the carriage 300 by a predetermined amount of movement in the sub-scanning forward direction (X1 direction) (step S240) and then the reading R2 (step S210) is performed again. The movement of the carriage 300 in step S240 is represented by "movement D" (see FIG. 12). The movement D is a process to ensure a distance by which the carriage 300 reaches a predetermined reading speed in the second-time reading R2 (step S210). Thus, in the reading R2 after the movement D, reading is not performed until the carriage 300 has moved by the amount of movement through the movement D since the carriage 300 starts moving, so that the carriage 300 is in a so-called idle running state.

As shown in FIG. 12, the control unit 230 (see FIG. 3) repeatedly executes the reading R2 and the movement D (step S210 to step S240 in FIG. 7) until the characteristic point CP has been detected from the read image I2. As the characteristic point CP has been detected from the read image I2, as described above, after the movement E (step S250), the process returns to the process in step S110.

Here, in the process to search the characteristic point CP in the read image I2 (step S220 in FIG. 7), there is a possibility that the characteristic point CP may be erroneously detected at a portion on the read image I2, which does not correspond to the characteristic image CI, because of the influence of dirt, noise, or the like. When the characteristic point CP has been erroneously detected as well, as in the case that the characteristic point CP is properly detected, after the movement E, the processes in step S110 to step S150 will be executed (see FIG. 13). Because the processes at this time are performed based on the erroneously detected position of the characteristic point CP, the image of the reference pattern is not detected from the read image I1 in the reference pattern searching process in step S150 (No in step S160 in FIG. 7). In this case, because it is not the first-time unsuccessful detection (No in step S180), the carriage 300 is moved by a predetermined amount of movement in the sub-scanning reverse direction (X2 direction) (step S260) and then the processes in step S200 to step S220 are executed again. The movement of the carriage 300 in step S260 is represented by "movement F".

As shown in FIG. 13, the movement F is a process that is performed so that a position EP, at which the characteristic point CP is erroneously detected, will not be read again in the following reading R2 (step S210). Thus, in the movement F, the carriage 300 is moved to a position to the side in the sub-scanning reverse direction (X2 direction) with respect to the position EP at which the characteristic point CP is erroneously detected. Note that the amount of movement through the movement F is set in consideration that an unread range will not appear between the range in which the reading R2 will be performed thereafter and the range in which the reading R2 has been performed before then.

As described above, in the home position searching process performed by the scanner 10 according to the present embodiment, searching of the characteristic point CP is performed within a search range, which is a portion of the target line TL, in the process to search the image of the reference pattern from the image data that represent the read image I1 (step S150 in FIG. 7), and setting of the pixel groups PG and determination of condition for each of the pixel groups PG are performed in the target line TL in which the characteristic point CP has been detected. That is, in regard to the target line TL in which no characteristic point CP has been detected, setting of the pixel groups PG or determination of condition for each of the pixel groups PG is not performed. Thus, in the present embodiment, it is possible to reduce time required for detecting the image of the reference pattern in the image data that represent the read image I1.

In addition, in the present embodiment, in determination of condition for each of the pixel groups PG (step S380 in FIG. 8), because it is not intended to search a position, it is determined that detection of the image of the reference pattern is successful only when it is determined that all seven pixel groups PG satisfy the condition. When the condition is not satisfied in determination of at least one of the pixel groups PG, irrespective of whether determination on other pixel groups PG has been executed, it is determined that detection of the image of the reference pattern on the basis of the set pixel groups PG has failed. Thus, in the present embodiment, it is possible to further reduce time required for detecting the image of the reference pattern in the image data that represent the read image I1.

In addition, in the present embodiment, the pixel groups PG are set on the basis of the characteristic point CP (adjusted characteristic point CPa) that is adjusted in position by the adjustment unit 278 (see FIG. 3). Then, when detection of the image of the reference pattern on the basis of the set pixel groups PG has failed, the adjustment value Va is changed and the adjusted characteristic point CPa is set again, so that setting of the pixel groups PG and detection of the image of the reference pattern are performed again. Thus, in the present embodiment, it is possible to suppress the occurrence of omissions of detection when the image of the reference pattern is detected from the image data that represent the read image I1.

In addition, in the present embodiment, the pixel groups PG are set so that a space of the predetermined number of pixels is provided between any adjacent pixel groups PG (see FIG. 17). Thus, in the present embodiment, it is possible to suppress the occurrence of omissions of detection of the reference pattern in the image data that represent the read image I1.

In addition, in the present embodiment, the reading R2 by which the read image I2 is generated is performed using the general-purpose parameter value. In addition, the general-purpose parameter value is set so that at least the characteristic point CP can be detected from image data, which are generated through reading of the reference pattern using the general-purpose parameter value. Thus, irrespective of whether the preliminary reading PR is performed under the white reference plate 30, when the read image I2 is an image that includes the image of the reference pattern, the characteristic point CP will be detected. When the characteristic point CP has been detected, the specific position of the image of the reference pattern is specified. Thus, in the present embodiment, it is possible to reliably and quickly detect the image of the reference pattern in the image data that represent the read image I1.

In addition, in the present embodiment, searching of the characteristic point CP in the read image I2 is performed over a portion of the search range (the initial search range SA or unsearched range within the initial search range SA). Thus, in the present embodiment, it is possible to reduce time required for searching the characteristic point CP in the read image I2.

In addition, in the present embodiment, the read image I2 is generated so that the resolution of the read image I2 in the sub-scanning corresponding direction is lower than that of the read image I1. Thus, the reading range through the reading R2 for generating the read image I2 will be wider than that through the reading R1. Thus, in the present embodiment, it is possible to reduce time required for specifying the schematic position of the reference pattern.

In addition, in the present embodiment, when no image of the reference pattern has been detected from the read image I1 after the characteristic point CP had been erroneously detected from the read image I2, the movement (movement F) of the carriage 300 is performed so that the position at which the characteristic point CP is erroneously detected will not be read again. Thus, in the present embodiment, it is possible to suppress the occurrence of endless loop of the process, and it is possible to reliably specify the schematic position of the reference pattern.

B. Alternative Embodiments

Note that the aspects of the invention are not limited to the example embodiments or embodiment described above, but they may be modified into various alternative embodiments without departing from the scope of the appended claims. The following alternative embodiments are, for example, applicable.

B1. First Alternative Embodiment

The configuration of the scanner 10 according to the above embodiment is just an example. Another configuration may be employed as the configuration of the scanner 10. For example, instead of the so-called close contact type scanner 10, a scanner having a so-called reducing optical system that uses a mirror or a lens may be employed. In addition, the scanner 10 may be provided with a DC motor instead of the stepping motor 226. In addition, the scanner 10 may be configured as a so-called multifunctional printer that has, for example, a printer unit. In this case, for example, the control unit 230 and the power supply unit 250 shown in FIG. 2 may be shared between the scanner 10 and the printer unit.

In addition, in the above described embodiment, the mechanism (the guide rail 210, the timing belt 222, the pulleys 224, the stepping motor 226, and the gear 228) that implements the movement of the carriage 300 of the scanner 10 in the sub-scanning direction is just an example. The movement of the carriage 300 in the sub-scanning direction may be implemented using another mechanism.

B2. Second Alternative Embodiment

The configuration of the reference pattern in the above embodiment is just an example. As far as the reference pattern is formed of a plurality of regions that are aligned along the main scanning direction, another pattern may be employed as the reference pattern. In addition, in the above embodiment, the characteristic portion of the reference pattern uses the second edge 144b of the second reference mark hole 140 to the side in the main scanning reverse direction; however, another portion of the reference pattern may be used as the characteristic portion.

B3. Third Alternative Embodiment

In the above embodiment, detection of the characteristic point CP or determination of condition for each of the pixel groups PG is performed using the luminance value of each pixel; however, these detection or determination may be performed using another value related to each pixel. For example, when the read images I1 and I2 are generated as RGB image data, the above detection or determination may be performed using the G value.

In addition, in the above embodiment, the resolution in the sub-scanning direction is set lower in the reading R2 for generating the read image I2; however, this configuration is not necessary. The resolution in the reading R2 may be set the same as the resolution in the reading R1 for generating the read image I1. In addition, the reading R2 is performed using the general-purpose parameter value; however, it is not necessary. In the reading R2 as well, a reading parameter value that is set on the basis of the result of the preliminary reading PR may be used.

In addition, in the above embodiment, in the process to search the image of the reference pattern (see FIG. 8), the position of the detected characteristic point CP is adjusted and the pixel groups PG are set on the basis of the adjusted characteristic point CPa; however, it is also applicable that adjustment of the position of the characteristic point CP is not performed.

B4. Fourth Alternative Embodiment

The size (the number of pixels in the main scanning corresponding direction and in the sub-scanning corresponding direction) and/or the value of the resolution of the read images I1 and I2 according to the above embodiment are just an example. The size and/or the resolution may be set to another value. In addition, the value of the first threshold value T1 and second threshold value T2 may also be selectively set. In addition, the adjustment value Va may also be selectively set.

B5. Fifth Alternative Embodiment

In the above embodiments, a portion of configuration implemented by hardware may be replaced by software, or, conversely, a portion of configuration implemented by software may be replaced by hardware.

What is claimed is:

1. An image reading apparatus comprising:
a reading unit that reads an object and generates image data on the basis of a read result;
a control unit that controls the reading unit;
a pattern region that includes a predetermined pattern that has a characteristic portion defining a reference position for specifying a reading position in the sub-scanning direction; and
a reference color region that is colored in a predetermined reference color, wherein
the control unit includes:
a preliminary read processing unit that instructs the reading unit to perform preliminary reading to get a first reading parameter on the basis of a relationship between the reference color and image data generated by the preliminary reading;
a first image acquisition unit that acquires first image data by instructing the reading unit to perform reading using the first reading parameter;
a pattern searching unit that searches an image of the predetermined pattern in the first image data;
a second image acquisition unit that, when an image of the predetermined pattern has not been detected by the pattern searching unit, acquires second image data by instructing the reading unit to perform reading using the general-purpose value stored in advance;
a characteristic portion searching unit that searches the characteristic portion in the second image data; and
a reprocessing instruction unit that specifies a schematic position of the reference color region in the sub-scanning direction on the basis of a position of the image of the characteristic portion detected by the characteristic portion searching unit, and that instructs the preliminary read processing unit to perform preliminary reading again at the schematic position of the reference region.

2. The image reading apparatus according to claim 1, wherein the second image acquisition unit instructs the reading unit to repeatedly perform reading while changing the reading position and to repeatedly acquire the second image data until the image of the characteristic portion has been detected by the characteristic portion searching unit.

3. The image reading apparatus according to claim 1, wherein the predetermined pattern is formed of a plurality of regions that are aligned along the main scanning direction, and wherein the characteristic portion is a boundary portion of the two adjacent regions that constitute the predetermined pattern.

4. The image reading apparatus according to claim 1, wherein the characteristic portion searching unit searches the image of the characteristic portion from a portion of data corresponding to the position of the characteristic portion in the second image data.

* * * * *